(12) United States Patent
Yoshikawa et al.

(10) Patent No.: US 8,936,137 B2
(45) Date of Patent: Jan. 20, 2015

(54) DISC BRAKE APPARATUS WITH PARKING MECHANISM

(75) Inventors: Kazuhiro Yoshikawa, Tokyo (JP); Shinichi Yamadera, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 71 days.

(21) Appl. No.: 13/575,148

(22) PCT Filed: Jan. 26, 2011

(86) PCT No.: PCT/JP2011/051525
§ 371 (c)(1),
(2), (4) Date: Jul. 25, 2012

(87) PCT Pub. No.: WO2011/093350
PCT Pub. Date: Aug. 4, 2011

(65) Prior Publication Data
US 2012/0292137 A1    Nov. 22, 2012

(30) Foreign Application Priority Data

Jan. 26, 2010 (JP) .................. 2010-014206
Aug. 30, 2010 (JP) .................. 2010-191907

(51) Int. Cl.
| | |
|---|---|
| F16D 55/08 | (2006.01) |
| F16D 65/56 | (2006.01) |
| F16D 65/18 | (2006.01) |
| F16D 121/02 | (2012.01) |
| F16D 121/14 | (2012.01) |
| F16D 123/00 | (2012.01) |
| F16D 125/28 | (2012.01) |
| F16D 125/36 | (2012.01) |
| F16D 127/06 | (2012.01) |

(52) U.S. Cl.
CPC .............. *F16D 65/567* (2013.01); *F16D 65/18* (2013.01); *F16D 2121/02* (2013.01); *F16D 2121/14* (2013.01); *F16D 2123/00* (2013.01); *F16D 2125/28* (2013.01); *F16D 2125/36* (2013.01); *F16D 2127/06* (2013.01)
USPC .................... 188/72.7; 188/71.9; 188/72.9

(58) Field of Classification Search
USPC ........... 188/71.1, 71.7, 71.8, 71.9, 72.1, 72.4, 188/72.6, 72.7, 72.8, 72.9
See application file for complete search history.

(56) References Cited

U.S. PATENT DOCUMENTS

| | | | | |
|---|---|---|---|---|
| 7,506,733 | B1 * | 3/2009 | Lee .............................. | 188/72.7 |
| 7,523,815 | B2 * | 4/2009 | Petri et al. .................... | 188/72.6 |
| 8,443,949 | B2 * | 5/2013 | Mahoudeaux et al. ...... | 188/72.7 |
| 2007/0045062 | A1 * | 3/2007 | Watada ........................ | 188/72.8 |

FOREIGN PATENT DOCUMENTS

| | | |
|---|---|---|
| CN | 1961165 | 5/2007 |
| CN | 100424374 | 10/2008 |

(Continued)

*Primary Examiner* — Thomas J Williams
(74) *Attorney, Agent, or Firm* — Drinker Biddle & Reath LLP

(57) ABSTRACT

Some of the components of a parking brake mechanism are incorporated between an inner side case and an outer side case, the two case and are combined by engaging lock holes and lock claws, and an inner side auxiliary assembly is formed. In this state, the diameter of circumscribed circle of the lock claws is configured to be smaller. Then, when the inner side auxiliary assembly is incorporated in the cylindrical space, the two lock claws are engaged with a lock concave which is formed on the inner peripheral surface of the cylindrical space by making the two lock claws protrude greatly from the outer peripheral surface of the inner side case.

14 Claims, 29 Drawing Sheets

(56) References Cited

FOREIGN PATENT DOCUMENTS

| | | | |
|---|---|---|---|
| IT | TO 2001000681 | * | 1/2003 |
| JP | 6-300063 | | 10/1994 |
| JP | 2004-286202 | | 10/2004 |
| JP | 2006-2867 | | 1/2006 |
| JP | 2006-266296 | | 10/2006 |
| JP | 2007-177995 | | 7/2007 |
| JP | 2008-522106 | | 6/2008 |
| JP | 2009-24795 | | 2/2009 |

* cited by examiner (A)

(B)

(A)

(B)

(A)

(B)

(A)

(B)

(A)

(B)

DISC BRAKE APPARATUS WITH PARKING MECHANISM

TECHNICAL FIELD

This invention is related to a disc brake apparatus with a parking mechanism which is provided with an adjusting mechanism for maintaining the gap between the linings of pads and rotors in an un-braking state at an appropriate value irrespective of wear of the linings.

BACKGROUND ART

Conventionally, it is widely known, as described, for example, in patent documents 1 to 3, that a disc brake apparatus with a parking mechanism performs braking at the time of running (service brake) by means of hydraulic pressure, and performs braking at the time of parking (parking brake) mechanically. FIGS. 30 and 31 show structures described in the patent document 2. First, the conventional structure is briefly explained. A rotor 1 is rotated together with a vehicle wheel. A support member 2 is fixed to a vehicle body (a component of a suspension system, such as a knuckle) and is near the rotor 1. Inner and outer pads 3 and 4 and a caliper 5 are supported by the support member 2 to be displaceable in an axial direction (in the description and claims, the axial direction, if not specified otherwise, refers to the axial direction of the rotor 1). The caliper 5 is formed by bonding and fixing a main part 6 which forms one part of the caliper 5 from the outer side to the middle, and a subpart 7 which forms the other part of the caliper 5 at the inner side by bolts 8 and 8. A piston 10 is fitted via a sleeve 11 in a cylindrical space 9 which is provided at the anti-rotor side half part of the main part 6 to be displaceable in the axial direction and fluid tightly sealed. An adjusting mechanism 12 and a cam mechanism 13 are provided between the piston 10 and the back end surface of the subpart 7 successively from the piston 10 side.

When the service brake is operated, a hydraulic pressure is applied in the cylindrical space 9 (pressurized brake oil is sent inside), the piston 10 is displaced in a direction of approaching the rotor 1, and the inner pad 3 is pressed against the inner side surface of the rotor 1. Due to a reaction of the pressing, the caliper 5 is displaced to the inner side relative to the support member 2, and the outer pad 4 is pressed against the outer side surface of the rotor 1 by a caliper claw 14 which is formed at the outer side end of the caliper 5. As a result, the rotor 1 is strongly pressed from both sides in the axial direction so that a braking is performed.

When the parking brake is operated, a cam shaft 16 which forms a cam mechanism 13 is rotated by a parking lever 15. Then, based on this rotation, the engagement of rollers 17 and 17 and cam surfaces 18a and 18b changes so that the distance between a pair of cam members 19a and 19b is expanded and an adjusting spindle 20 is pressed in the direction of approaching the rotor 1. Then, the adjusting spindle 20 presses the piston 10 in a direction of approaching the rotor 1 via an adjusting screw 21. As a result, similarly to the service brake mentioned above, the rotor 1 is held from both sides in the axial direction by the inner and outer pads 3 and 4 so that a braking is performed.

When the wear of linings which form the two pads 3 and 4 develops, the adjusting screw 21 will be rotated and displaced in the direction of approaching the rotor 1 relative to the adjusting spindle 20 at the time of the service brake. When the service brake is released, the retreated location of the piston 10 moves to the rotor 1 side, and the wear of the linings which form the two pads 3 and 4 is compensated. If an excessive brake fluid pressure is applied to the piston 10 when the service brake is operated, for example, in a sudden braking, the adjusting screw 21 becomes unable to be rotated relative to the adjusting spindle 20, the adjusting spindle 20 resists the resilientity of a spring 22, and moves in the direction of approaching the rotor 1 together with the adjusting screw 21. Thus, a so-called over adjustment, which makes the piston 10 to be displaced in the direction of approaching the rotor 1 so that the linings which form the two pads 3 and 4 rub against both side surfaces of the rotor 1 at the time of un-braking, is prevented.

It is clear from FIG. 31 that the above disc brake apparatus with the parking mechanism has many small components, and the assembly operation is troublesome. For the conventional structure shown in FIGS. 30 and 31, since the caliper 5 is divided as the main part 6 and the subpart 7, after many of the components which form the parking mechanism among the components of the caliper 5 are attached to the subpart 7, the assembly operation can be performed comparatively easily by combining the subpart 7 and the main part 6 with the bolts 8 and 8. However, it is disadvantageous to use a two-piece type caliper if the size and weight of the disc brake apparatus with the parking mechanism including the caliper are to be reduced. In order to reduce the size and the weight of the disc brake apparatus with the parking mechanism, it is preferred to use an integrated caliper like the structure of the invention described in the patent documents 1 and 3. However, in this case, it is necessary to consider facilitating the operation of assembling the small components which form the adjusting mechanism into the back end (anti-rotor side end) of the cylindrical space provided in the caliper.

Although an assembly technique is described in the patent document 1 in which after the components have been incorporated in the inner part of the cylindrical space, a snap ring for locking is suitably used in assembling, it is not avoided that the assembly operation becomes troublesome. On the other hand, a technique is described in the patent document 3 (the paragraph [0027] of the description and FIGS. 1 and 5), in which components of the parking mechanism which make a thrust to be generated due to a mechanical structure are packed as a sub-assembly unit by a cartridge (31) and a spring retainer (27), and are kept in the cylindrical space. However, for the structure of the invention described in the patent document 3, when the sub-assembly unit is assembled outside the cylindrical space, since the cartridge (31) and some components (inclined element 12) are combined while a part of the cartridge (31) is bended (forming a reshaped lug 32), the combination operation becomes troublesome. In addition, for the structure of the invention described in the patent document 3, when the sub-assembly unit which is assembled beforehand outside is pushed into the cylindrical space of the caliper, it is likely that a protrusion lug (28) of the spring retainer (27) rubs against the inner peripheral surface of the cylindrical space (bore 4). When the inner peripheral surface of the cylindrical space is rubbed, the inner peripheral surface of the cylindrical space may be damaged.

CITATION LIST

Patent Documents

[Patent document 1] Japan Patent Publication No. 2004-286202

[Patent document 2] Japan Patent Publication No. 2007-177995

[Patent document 3] Japan Patent Publication No. 2008-522106

SUMMARY OF INVENTION

One aspect of the invention provides a disc brake apparatus which has a structure so that the operativity of assembling the components, among the components of an adjusting mechanism and a parking mechanism, that are incorporated into the inner part of a cylindrical space provided in a caliper is improved, and the inner peripheral surface of the cylindrical space is not likely to be damaged in the assembling operation.

A disc brake apparatus with a parking mechanism includes a rotor, a support member, an inner pad and an outer pad, a caliper, a piston and a parking mechanism.

The rotor is rotated with a vehicle wheel.

And, the support member is adjacent to the rotor and is supported by and fixed to a vehicle body.

And, the inner pad and the outer pad hold the rotor from both sides in the axial direction, and are supported by the support member to be displaceable in the axial direction.

And, the caliper is provided with a caliper claw at an outer side end to push an outer side surface of the outer pad, and a cylindrical space at an inner side half part which opens to the inner pad, respectively, and is supported by the support member to be displaceable in the axial direction.

And, the piston is embedded in a part of the cylindrical space that is close to the opening, and is displaceable in the axial direction; and And, the parking mechanism is provided between a back end surface of the cylindrical space and the piston. The parking mechanism expands an axial dimension with a rotation of a component that is rotated with a swing displacement of a parking lever which is provided outside the cylindrical space, and pushes the piston toward the inner pad.

The disc brake apparatus with a parking mechanism may further include an anti-rotor side case and a rotor side case.

Components among the components of the parking mechanism except components that are installed to the piston may be installed between the anti-rotor side case and the rotor side case. And the anti-rotor side case may be embedded and supported in the back end of the cylindrical space, and the rotor side case may be placed at a rotor side of the anti-rotor side case.

And, a plurality of lock claws which are bended outwards in a radial direction of the rotor side case may be formed at an anti-rotor side end of the rotor side case of the two cases. Lock parts which have end edges that face to the anti-rotor side may be formed at a part of the anti-rotor side case.

Further, in a state before the anti-rotor side case and the rotor side case are installed at predetermined positions of the cylindrical space, the two cases may be configured to be prevented from being separated by means of an engagement of the lock claws and the lock parts.

On the other hand, in a state where the anti-rotor side case of the two cases is embedded at a predetermined position of the back end of the cylindrical space and the rotor side case is installed at a predetermined position of the cylindrical space, the two cases may be configured to be prevented from being uninstalled from the cylindrical space by engaging the lock claws with a lock concave which is formed on an inner peripheral surface of the cylindrical space.

Other features and advantages become clear from the description of embodiments and the attached claims.

BRIEF DESCRIPTION OF DRAWINGS

FIGS. 11(A) and 11(B) are figures which show a sub-assembly unit that is assembled but not installed into a cylindrical space, in which FIG. 11(A) is a perspective view which is seen from the rotor side, and FIG. 11(B) is a half sectional view of FIG. 11(A).

FIGS. 12(A) and 12(B) are figures which show the sub-assembly unit that is assembled and installed into the cylindrical space, in which FIG. 12(A) is a perspective view which is seen from the rotor side, and FIG. 12(B) is a half sectional view of FIG. 12(A).

FIGS. 15(A) and 15(B) are figures which show the sub-assembly unit that is assembled but not installed into a cylindrical space, in which FIG. 15(A) is a perspective view which is seen from the rotor side, and FIG. 15(B) is a partially sectioned perspective view of FIG. 15(A).

FIGS. 16(A) and 16(B) are figures which show the sub-assembly unit that is assembled and installed into the cylindrical space, in which FIG. 16(A) is a perspective view which is seen from the rotor side, and FIG. 16(B) is a partially sectioned perspective view of FIG. 16(A).

FIGS. 18(A) and 18(B) are figures which show a sub-assembly unit, which combines beforehand components that are installed to the inner part of a cylindrical space, when the sub-assembly unit is assembled but not installed into the cylindrical space, in which FIG. 18(A) is a perspective view which is seen from the rotor side, and FIG. 18(B) is a sectional view of FIG. 18(A).

FIGS. 19(A) and 19(B) are figures which show the sub-assembly unit that is assembled and installed into the cylindrical space, in which FIG. 19(A) is a perspective view which is seen from the rotor side, and FIG. 19(B) is a sectional view of FIG. 19(A).

FIGS. 25(A) and 25(B) are figures which show the sub-assembly unit that is being assembled, in which FIG. 25(A) is a perspective view which is seen from the rotor side, and FIG. 25(B) is a sectional view of FIG. 25(A).

FIGS. 26(A) and 26(B) are figures which show the sub-assembly unit that has been assembled, in which FIG. 26(A) is a perspective view which is seen from the rotor side, and FIG. 26(B) is a sectional view of FIG. 26(A).

FIGS. 28(A) and 28(B) are figures which show the assembled sub-assembly unit that is being installed into the cylindrical space, in which FIG. 28(A) is a perspective view which is seen from the rotor side, and FIG. 28(B) is a sectional view of FIG. 28(A).

FIGS. 29(A) and 29(B) are figures which show the sub-assembly unit that is assembled and installed into the cylindrical space, in which FIG. 29(A) is a perspective view which is seen from the rotor side, and FIG. 29(B) is a sectional view of FIG. 29(A).

DESCRIPTION OF EMBODIMENTS

The First Example of Typical Embodiments

Figure 1:
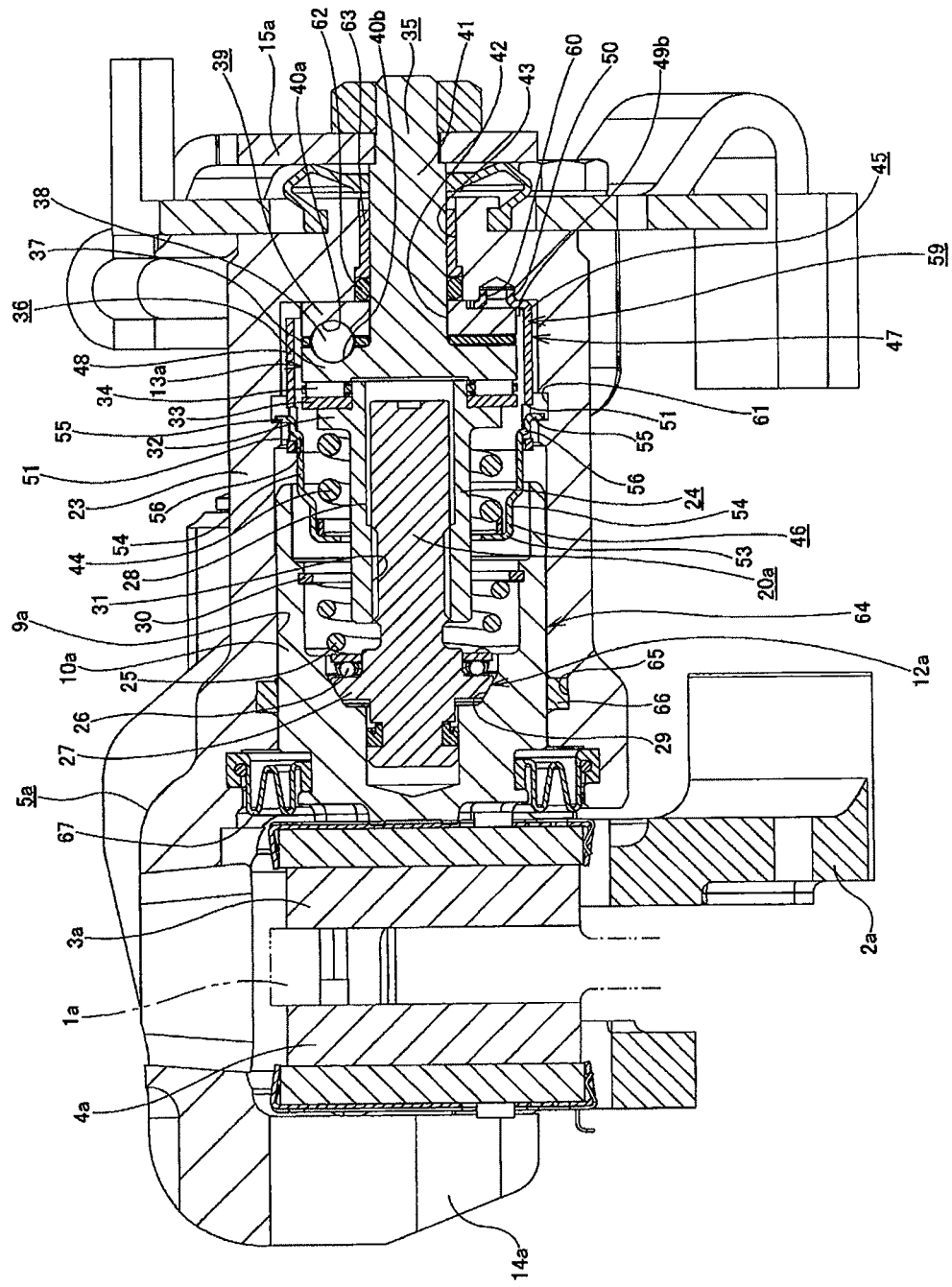
FIG. 1 is a sectional view of a virtual plane containing the central axis of a rotor which shows the first example of embodiments of the invention.

FIGS. 1 to 9 show the first example of the typical embodiments of the invention. This example shows that a typical embodiment is applied to a floating caliper type disc brake which makes a hydraulic pressure type service brake for stopping a running vehicle and a mechanical parking brake for maintaining the vehicle in a stop state to operate, respectively. For this reason, in the structure of this example, inner and outer pads 3a and 4a and a caliper 5a are supported by a support member 2a which is near a rotor 1a which is rotated with a vehicle wheel and fixed to a vehicle body, and are displaceable in the axial direction. The inner and outer pads 3a and 4a are provided so that the rotor 1a is hold in the axial direction from both sides. The caliper 5a is provided with a caliper claw 14a at the outer side end, and a cylindrical part 23 at the inner side middle part, respectively. A piston 10a is fitted inside a cylindrical space 9a which is provided inside the cylindrical part 23 and opens towards the rotor 1a so that the piston 10a is displaceable in the axial direction and fluid tightly sealed. Between the piston 10a and the back end surface of the cylindrical space 9a, an adjusting mechanism 12a for maintaining the gaps between the both side surfaces of the rotor 1a and the linings of the two pads 3a and 4a in an un-braking state at an appropriate value, and a cam mechanism 13a which forms a parking mechanism are provided successively from the piston 10a side.

The adjusting mechanism 12a is provided with an adjusting nut 24, an adjusting spindle 20a, an adjusting spring 25 and a thrust bearing 26. An adjusting collar 27 is formed in the middle part of the adjusting spindle 20a and is close to the rotor side, and a multi-thread male screw 28 is formed to be close to the anti-rotor side of the adjusting spindle 20a. The outer peripheral surface of the adjusting collar 27 is a partially conically-shaped convex surface which is inclined in a direction so that the outer diameter decreases towards the rotor side, and faces a receiving surface 29 which is provided at the middle part of the inner peripheral surface of the piston 10a in the axial direction, and is a partially conically-shaped concave surface which is inclined at the same angle (in the same direction) as the outer peripheral surface of the adjusting collar 27. The adjusting spring 25 and the thrust bearing 26 are formed between a snap ring 30 and the adjusting collar 27 successively from the snap ring 30 side. The snap ring 30 is locked into the part of the inner peripheral surface of the piston 10a that is close to the anti-rotor side. A multi-thread female screw 31 is formed on the inner peripheral surface of the adjusting nut 24, and is screwed with the multi-thread male screw 28 of the adjusting spindle 20a.

On the other hand, the cam mechanism 13a is a ball ramp type cam mechanism, and is partially provided between a thrust receiving collar 32 and the back end surface of the cylindrical space 9a. The thrust receiving collar 32 is formed at the part of the outer peripheral surface of the adjusting nut 24 that is close to the anti-rotor side. In this example, successively from the thrust receiving collar 32 side, a thrust washer 33, a thrust needle bearing 34, a ramp plate part 36 of a ramp shaft 35, a plurality of balls 38 and 38, and a ramp plate 39 are provided. The plurality of balls 38 and 38 are retained by a retainer 37 to be equally spaced in the circumferential direction and freely rotatable. Ramp slots 40a and 40b are respectively formed at a plurality of places (in the example shown in the figure, three places for each) on the surfaces of the ramp plate 39 and the ramp plate part 36 which are opposite to each other. The shape of these ramp slots 40a and 40b, when seen from the axial direction respectively, is a partial circular arc, and the depth of these ramp slots 40a and 40b changes gradually in the circumferential direction.

Figure 2:
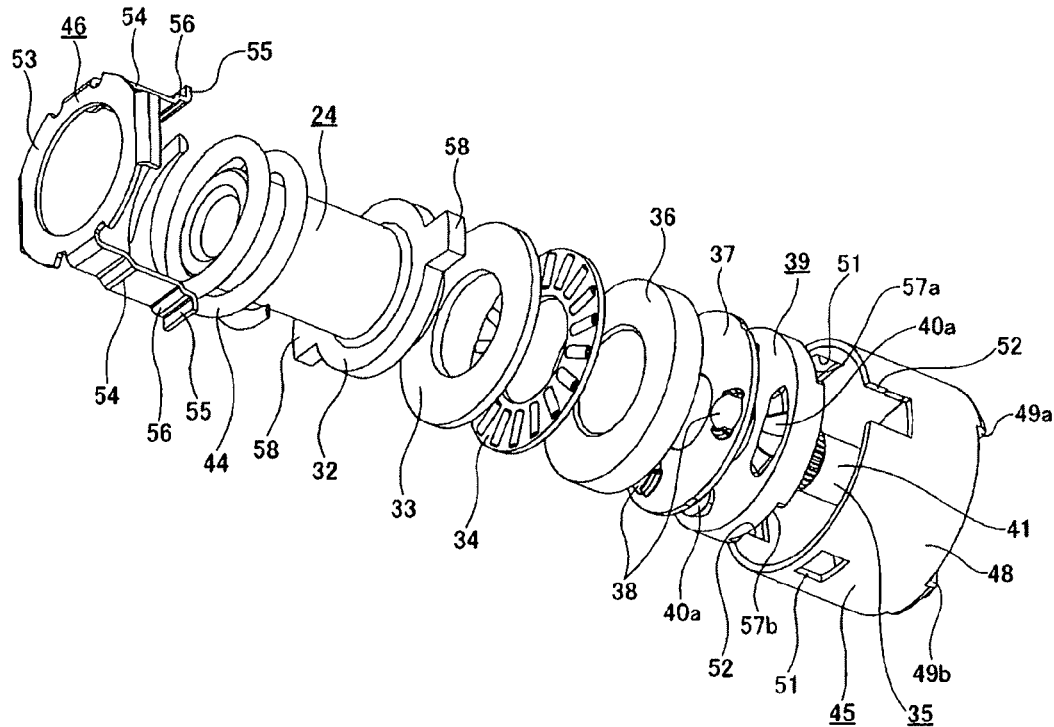
FIG. 2 is an exploded perspective view which is seen from the rotor side and which shows a sub-assembly unit which combines beforehand components that are installed to the inner part of a cylindrical space.
Figure 3:
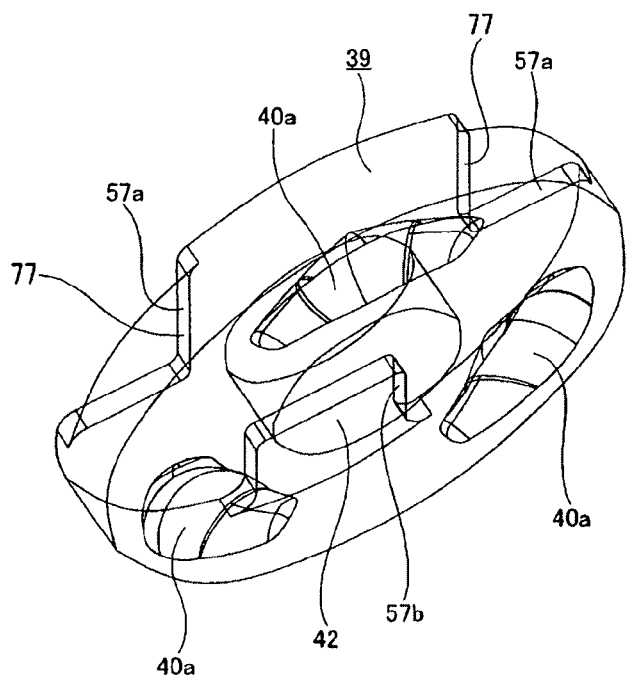
FIG. 3 is a perspective view which is seen from the rotor side and which shows a ramp plate.

In this example, it is considered to use the ramp shafts 35 and the ramp plates 39 that have the same shapes respectively, to be attached to the right and left vehicle wheels. For this reason, as shown in FIGS. 2 and 3, each of the ramp slots 40a and 40b has such a shape that the central part is deepest and the depth is gradually decreased towards the two ends in the circumferential direction of the ramp shaft 35 and the ramp plate 39. However, if ramp shafts and ramp plates that have different shapes are needed to be used in the right and left vehicle wheels, the ramp slots will have such a shape that one end is deepest and the other end is shallowest in the circumferential direction of the ramp shafts and the ramp plates. In this case, the direction in which the depth of the ramp slots at the ramp shaft side changes, and the direction in which the depth of the ramp slots at the ramp plate side changes are reverse to each other. In the example shown in the figures, the changing directions of the parts that are engaged with each other via the balls 38 and 38 are also reverse to each other.

In any events, each of the balls 38 and 38 is rotatably held between the ramp slot 40b at the side of the ramp shaft 35, and the ramp slots 40a and 40a at the side of the ramp plate 39. A driving shaft 41, which forms the ramp shaft 35 together with the ramp plate part 36, is inserted into a central hole 42 of the ramp plate 39, and a through hole 43 which is formed at the bottom of the cylindrical part 23 to be fluid tightly sealed, rotatable, and displaceable in the axial direction. The base end of a parking lever 15a is bonded with and fixed to the front end of the driving shaft 41, which protrudes from the outside (the anti-rotor side) surface of the cylindrical part 23. When the ramp shaft 35 is rotated by the parking lever 15a, each of the balls 38 and 38 will roll along each of the ramp slots 40a and 40b (between a deep portion and a shallow portion), and the distance between the ramp plate part 36 and the ramp plate 39 will be expanded and contracted. When the distance is expanded, the adjusting nut 24 is pressed to the rotor side via the thrust needle bearing 34.

Figure 4:
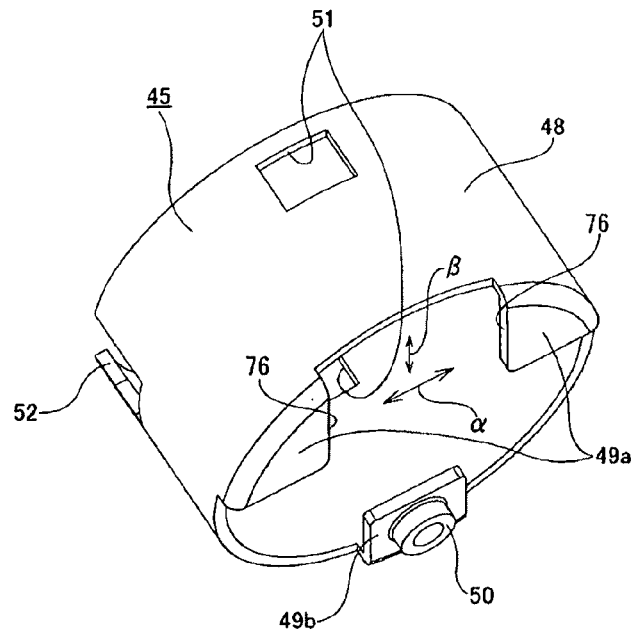
FIG. 4 is a perspective view which is seen from the anti-rotor side and which shows an anti-rotor side case.

The components 24, 33, 34, 35, 38, and 39 which form the above cam mechanisms 13a are accommodated in a cam case 47, which includes an anti-rotor side case 45 and a rotor side case 46, together with a preload spring 44 which is a compression spring described in the claims. The anti-rotor side case 45 is integrally formed by plastically machining, such as punching, spinning or burring, a metal plates used as a raw material, such as a stainless steel plate or a carbon steel plate, and has a cylindrical peripheral wall 48, for example, as shown in FIGS. 2 and 4. Bended boards 49a and 49b which are bended inwards in the radial direction of the peripheral wall 48 are formed at a plurality of place (in the example shown in the figure, three places) in the circumferential direction of the anti-rotor side edge of the peripheral wall 48. A pair of bended parts 49a and 49a which have an approximately triangular shape that has a right-angled peak are provided at one side, or at the semicircle part of the peripheral wall 48. The remaining bended part 49b is rectangular, and provided in the middle position of the two bended parts 49a and 49a in the peripheral direction of the peripheral wall 48. A cylindrical member 50 which protrudes to the anti-rotor side is formed in the center part of the remaining bended part 49b. A pair of lock holes 51 and 51 and a pair of guide notches 52 and 52 are alternately in the part of the peripheral wall 48 that is close to the rotor, and are equally spaced (every 90 degrees) in the circumferential direction of the peripheral wall 48. The pair of lock holes 51 and 51 are rectangular, and are formed at two positions, which are opposite to each other in the radial direction, at the rotor side end of the peripheral wall 48 so that the lock holes 51 and 51 do not reach the rotor side edge of the peripheral wall 48. On the other hand, the two guide notches 52 and 52 are rectangular, and are formed at two positions, which are opposite to each other in the radial direction, at the rotor side end of the peripheral wall 48 so that the guide notches 52 and 52 open at the rotor side edge of the peripheral wall 48.

Figure 5:
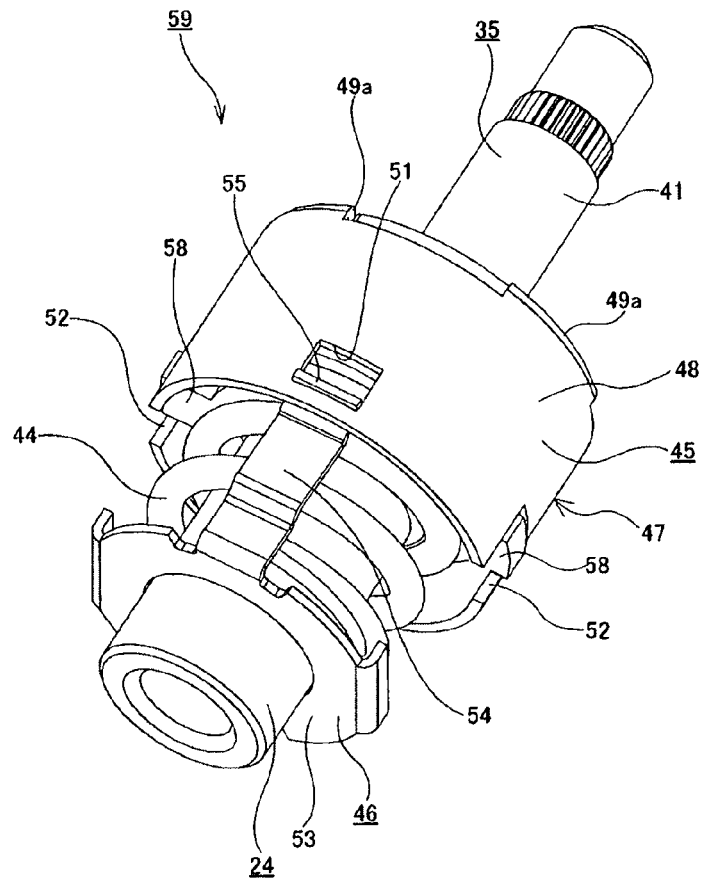
FIG. 5 is a perspective view which is seen from the rotor side and which shows the sub-assembly unit that is assembled but not installed into the cylindrical space.
Figure 8:
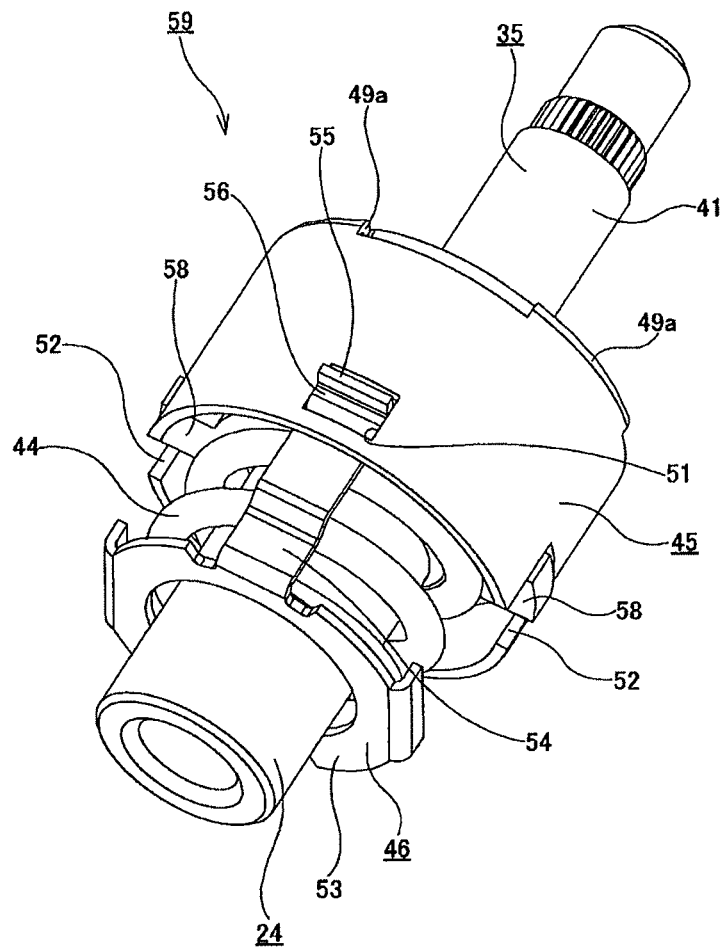
FIG. 8 is a perspective view which is seen from the rotor side and which shows the sub-assembly unit that is assembled and installed into the cylindrical space.

On the other hand, the rotor side case 46 is integrally formed by punching and bending a metal plate such as a stainless steel plate or a carbon steel plate, as shown in FIGS. 2, 5 and 8. The rotor side case 46 is provided with a retaining ring 53 and a pair of resilient arms 54 and 54 which are bended to the anti-rotor side from two positions, which are opposite to each other in the radial direction on the periphery edge of the retaining ring 53. Two lock claws 55 and 55 are formed by bending the front ends of the two resilient arms 54 and 54 at an approximate right angle outwards in the radial direction of the retaining ring 53, respectively. The parts of the two resilient arms 54 and 54 which are in the middle of the two resilient arms 54 and 54 and close to the front ends and which is somewhat closer to the base end side (the rotor side, or the retaining ring 53 side) than the two lock claws 55 and 55, are bended outwards so that the front ends are outside the base ends in the radial direction of the rotor side case 46, to form steps 56 and 56.

Thus, among the components which form the adjusting mechanism 12a and the parking mechanism, those components other than the components attached to the piston 10a are assembled between the anti-rotor side case 45 formed as mentioned above and the rotor side case 46 formed as mentioned above. Among the components which form the adjusting mechanism 12a and the parking mechanism, those components other than the components attached to the piston 10a are, as is apparent from FIGS. 1 to 2, the ramp plate 39, the retainer 37 and the balls 38 and 38, the ramp plate part 36 of the ramp shaft 35, the thrust needle bearing 34, the thrust washer 33, the adjusting nut 24, and the preload spring 44, successively from the anti-rotor side. The driving shaft 41 of the ramp shaft 35 is inserted into the central hole of the ramp plate 39 and the central hole of the retainer 37, and protrudes to the anti-rotor side beyond these components 39 and 37.

Among the components 39, 37, 38, 36, 34, 33, 24, and 44 incorporated between the two cases 45 and 46, the ramp plate 39 which is last attached in the anti-rotor side are fitted inside the back end (anti-rotor side edge) of the anti-rotor side case 45 so that rotation and displacement in the axial direction are inhibited. For this reason, concaves 57a and 57b, which are steadily engaged with the bended board 49a and 49b provided at the back end of the anti-rotor side case 45, are formed at the anti-rotor side surface of the ramp plate 39. The adjusting nut 24 is fitted into the rotor side part of the anti-rotor side case 45 that is close to the openings so that rotation is inhibited but displacement in the axial direction is possible. For this reason, a pair of guide protrusions 58 and 58 which protrude at two positions, which are opposite to each other in the radial direction, at the outer periphery edge of the thrust receiving collar 32 which is formed on the outer peripheral surface of the adjusting nut 24 are engaged with the guide notches 52 and 52 of the anti-rotor side case 45.

Figure 6:
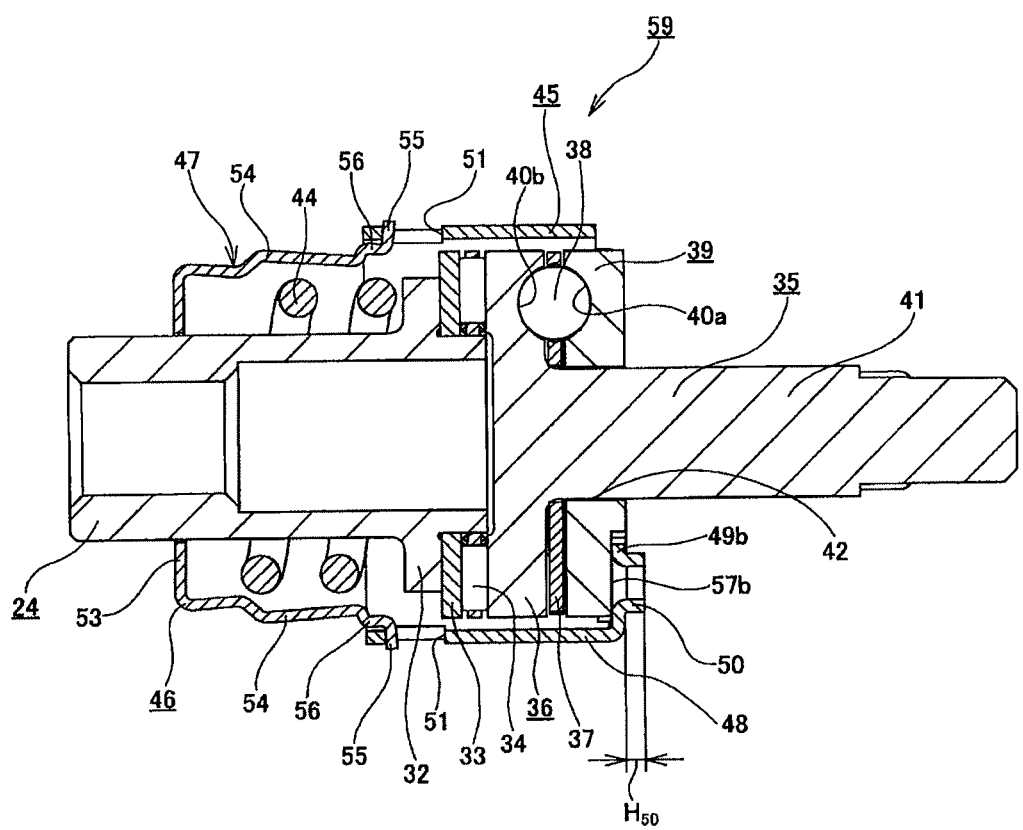
FIG. 6 is a sectional view which is seen from the same direction as that of FIG. 1.
Figure 7:
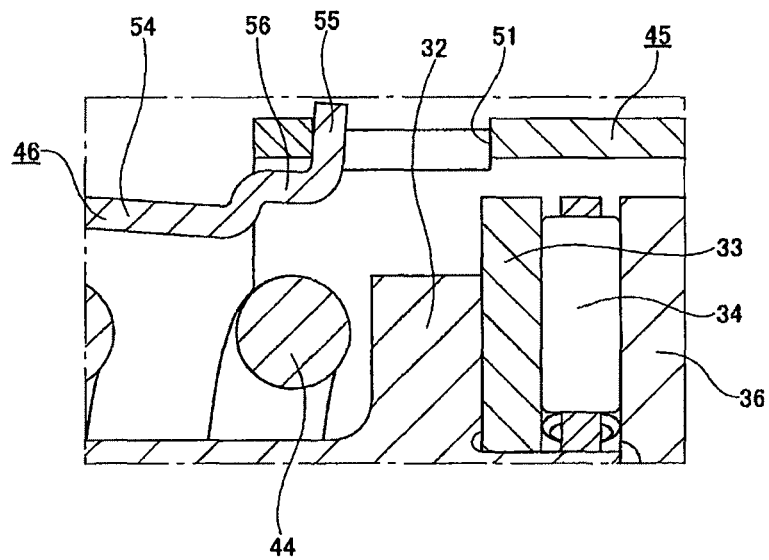
FIG. 7(A) is a partially expanded sectional view which shows an engagement relation of a lock claw with a lock hole and a lock concave after the sub-assembly unit is assembled and before the sub-assembly unit is installed into the cylindrical space.
FIG. 7(B) is a partially expanded sectional view which shows an engagement relation of the lock claw with the lock hole and the lock concave after the sub-assembly unit is assembled and installed into the cylindrical space.
Figure 7:
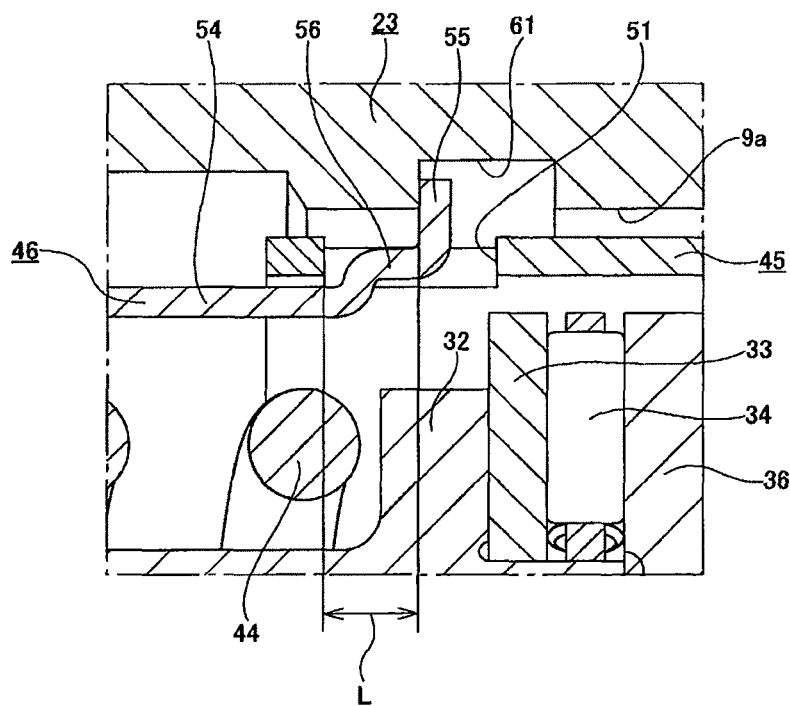

The operation of incorporating the components 39, 37, 38, 36, 34, 33, 24, and 44 between the two cases 45 and 46 is performed at a spacious place outside the cylindrical space 9a. After these components 39, 37, 38, 36, 34, 33, 24, and 44 are incorporated between the two cases 45 and 46, and before these components 39, 37, 38, 36, 34, 33, 24, and 44 are incorporated inside the cylindrical space 9a, the two cases 45 and 46, these cases 45 and 46 are connected inseparably. In this example, when the components 39, 37, 38, 36, 34, 33, 24, and 44 are arranged in a predetermined order between the two cases 45 and 46, the preload spring 44 is elastically compressed and the anti-rotor side case and the rotor side case 45 and 46 become close to each other. In this case, the two resilient arms 54 and 54 are made to resiliently deform in the direction to make the front ends get close to each other, and the force to restrict the two resilient arms 54 and 54 is not released until the distance between the two cases 45 and 46 is less than a predetermined distance. Thus, the two lock claws 55 and 55 which are formed at the front ends of the two resilient arms 54 and 54 are made to enter into the two lock holes 51 and 51 from the inside of the anti-rotor side case 45. In this state, when the force to make the anti-rotor side case 45 and the rotor side case 46 to get close is released, as shown in FIGS. 5, 6 and 7(A), the two lock claws 55 and 55 prevent the two cases 45 and 46 from separating by being engaged with the rotor side edges of the two lock holes 51 and 51. As a result, as shown in FIGS. 5 and 6, an anti-rotor side auxiliary assembly (assembly subunit) 59, in which some of the components of the parking mechanism and the adjusting mechanism 12a are attached between the two cases 45 and 46, is obtained.

The anti-rotor side auxiliary assembly 59 is pushed inside the cylindrical space 9a by making the back the anti-rotor side case 45 to enter first. A circular receiving hole 60 with a bottom part is formed in a part at the back end surface of the cylindrical space 9a which is far from the center of the back end surface of the cylindrical space 9a, and the cylindrical member 50 which is formed at the anti-rotor side surface of the anti-rotor side case 45 is inserted into the receiving hole 60. Thus, the anti-rotor side case 45 is prevented from rotating in the cylindrical space 9a by the engagement of the receiving holes 60 and the cylindrical member 50. The diameter of the circumscribed circle of the two lock claws 55 and 55 in the anti-rotor side auxiliary assembly 59 is much smaller than the inside diameter of the cylindrical space 9a. Therefore, when the anti-rotor side auxiliary assembly 59 is inserted into the cylindrical space 9a, it is prevented that the front end edges of the two lock claws 55 and 55 strongly rub against the inner peripheral surface of the cylindrical space 9a, and the inner peripheral surface is damaged.

In order to fully suppress the rotation of the anti-rotor side ramp plate 39 around its own central axis relative to the caliper 5a, it is necessary to support the anti-rotor side ramp plate 39 via the anti-rotor side case 45. The rotation of the anti-rotor side case 45 relative to the caliper 5a is stopped by the engagement of the receiving hole 60 and the cylindrical member 50. The rotation of the ramp plate 39 relative to the anti-rotor side case 45 is stopped by the engagement of a pair of side edges 76 and 76 (refer to FIG. 4) in parallel with each other which are provided at the bended boards 49a and 49a and a pair of stepped surfaces 77 and 77 (refer to FIG. 3) in parallel with each other which are provided at the two concaves 57a and 57a. Therefore, either of the gap of the engaging part of the receiving hole 60 and the cylindrical member 50 and the gap of the engaging part of the two side edges 76 and 76 and the two stepped surfaces 77 and 77, which are related to the wobble in the rotation direction (the direction of the arrow α of FIG. 4) around the central axis, is limited to a small value of about 0.05 to 0.2 mm. In contrast, as shown in FIG. 4 by the arrow β, it is not necessary to regulate the gaps in the radial direction of the ramp plate 39 and the anti-rotor side case 45 too strictly, and even if there is a wobble of, for example, about 0.3 to 0.5 mm, a problem will not be produced. On the other hand, it is not preferred to make the receiving hole 60 to be a long hole which is long in the radial direction of the ramp plate 39 and the anti-rotor side case 45, since the processing cost of the receiving hole 60 increases. Thus, in this example, instead of regulating strictly the assembly position accuracy of the anti-rotor side case 45 relative to the caliper 5a, the flexibility of the receiving hole 60 as a circular hole with a bottom part in the radial direction (the direction of the arrow β) relative to the anti-rotor side case 45 and the ramp plate 39 is ensured to a certain degree (about 0.3 to 0.5 mm). Thus, the manufacturing error which may be produced among the ramp shaft 35, the cylindrical part 23 and the through hole 43 can be absorbed.

Figure 9:
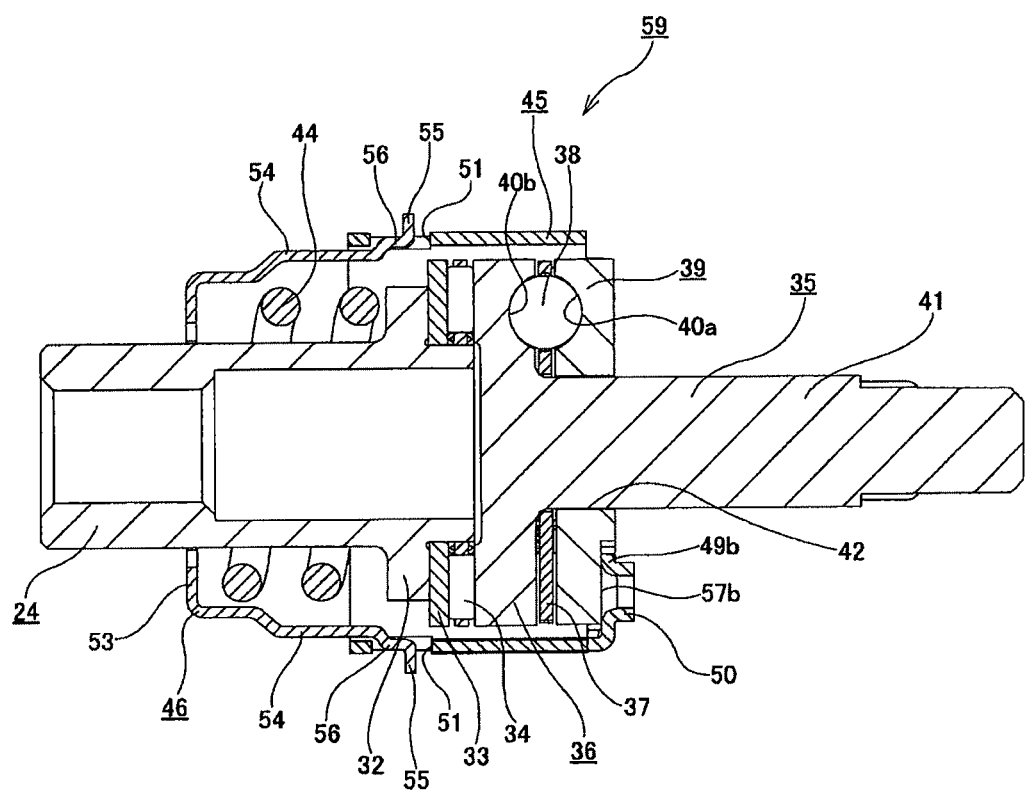
FIG. 9 is a sectional view which is seen from the same direction as that of FIG. 1.

As mentioned above, after the receiving hole 60 and the cylindrical member 50 are engaged, and the anti-rotor side surfaces of the bended boards 49a and 49b of the anti-rotor side case 45 contact with the back end surface of the cylindrical space 9a, the preload spring 44 is further elastically compressed, and the rotor side case 46 is pushed into the cylindrical space 9a. Then, as shown in FIGS. 7(B), 8 and 9, the steps 56 and 56 which are in the middle of the two resilient arms 54 and 54 and close to the front ends enter into the two lock holes 51 and 51, and the protrusion amount of the two lock claws 55 and 55 from the outer peripheral surface of the anti-rotor side case 45 increases. Thus, the front ends of the two lock claws 55 and 55 enter into a grooved lock concave 61 which is formed on the inner peripheral surface of the cylindrical space 9a and is extended over the whole peripheral surface. In this case, when the force to push the anti-rotor side case 45 into the cylindrical space 9a is releases, the front ends of the two lock claws 55 and 55 are engaged with the rotor side inner surface of the lock concave 61 by the elasticity of the preload spring 44. As a result, the components 45, 46, 39, 37, 38, 35, 34, 33, 24, and 44 of the anti-rotor side auxiliary assembly 59 are assembled into an appropriate position at the back half part (anti-rotor side half part) of the cylindrical space 9 without pulling out the anti-rotor side case 45 from the cylindrical space 9a.

The height $H_{50}$ (refer to FIG. 6) of the cylindrical member 50 is larger than the slide amount L of the rotor side case 46 relative to the anti-rotor side case 45 ($H_{50}$>L) from the state shown in FIG. 7(A) until the steps 56 enter into the lock holes 51 and the protrusion amount of the lock claws 55 from the outer peripheral surface of the anti-rotor side case 45 increases. Therefore, before at least the front end of the cylindrical member 50 enters in the receiving hole 60, the protrusion amount of the lock claws 55 from the outer peripheral surface of the anti-rotor side case 45 will not increase. Thus, by engaging the cylindrical member 50 and the receiving hole 60, the anti-rotor side auxiliary assembly 59 can be easily assembled inside the cylindrical space 9a so that the anti-rotor side auxiliary assembly 59 is suitably positioned in the circumferential direction. While the anti-rotor side auxiliary assembly 59 is inserted into the cylindrical space 9a, the driving shaft 41 of the ramp shaft 35 is inserted through the through hole 43 provided at the bottom part of the cylindrical part 23. An O ring 62 and a sleeve (radial sliding bearing) 63 are installed on the inner peripheral surface of the through hole 43 beforehand.

On the other hand, the adjusting spindle 20a, the adjusting spring 25, the thrust bearing 26, and the snap ring 30, which forms the adjusting mechanism 12a, are beforehand assembled to the inside of the piston 10a, and become a rotor side auxiliary assembly 64. Since the operation of assembling the rotor side auxiliary assembly 64 is also performed at a spacious place outside the cylindrical space 9a, it is easy. The rotor side auxiliary assembly 64 is assembled into the cylindrical space 9a by making the multi-thread male screw 28 provided at the front end (the anti-rotor side end) of the adjusting spindle 20a to be screwed with the multi-thread female screw 31 of the inner peripheral surface of the adjusting nut 24 of the anti-rotor side auxiliary assembly 59 which is beforehand incorporated in the cylindrical space 9a. An oil ring 66 for fluid tightly sealing beforehand is installed into a lock groove 65 which is provided at the part of the inner peripheral surface of the cylindrical space 9a that is close to the opening (part close to the rotor). Therefore, the piston 10a slides on and contacts with the inner peripheral surface of the oil ring 66 and is incorporated in the cylindrical space 9a.

After the rotor side auxiliary assembly 64 is incorporated at the specified position in the cylindrical space 9a following the anti-rotor side auxiliary assembly 59, a dustproof boot 67 is installed between the outer peripheral surface of the front end (rotor side end) of the piston 10a and the caliper 5a. Then, the caliper 5a is assembled to the support member 2a together with the inner and outer pads 3a and 4a to be displaceable in the axial direction, and the support member 2a is supported by and fixed to a component member of a suspension system, such as a knuckle so that the two pads 3a and 4a are arranged on both sides of the rotor 1a. Thus, the disc brake apparatus with the parking mechanism is completed.

When the service brake which makes a running vehicle slow down and stop is operated, a hydraulic pressure is applied in the cylindrical space 9a, and the piston 10a is pushed out from the cylindrical space 9a. As in the well-known floating caliper type disc brake, the linings of the two pads 3a and 4a are pressed against both side surfaces of the rotor 1a, and the vehicle is braked. When the linings of the two pads 3a and 4a are worn out and the movement amount of the piston 10a increases due to repeated brakes, the adjusting mechanism 12a will make the position of the piston 10a in an un-braking state to move to the rotor side like the conventional well-known adjusting mechanism. Namely, the outer peripheral surface of the adjusting collar 27 of the adjusting spindle 20a is separated from the abutment 29, the adjusting spindle 20a is rotated and displaced to the rotor side due to the elasticity of the adjusting spring 25 and the threaded engagement of the multi-thread male screw 28 and the multi-thread female screw 31, and the worn-out parts of the linings are compensated.

On the other hand, when the parking brake is operated, the ramp shaft 35 is rotated by the parking lever 15a. Then, each of the balls 38 and 38 rolls from a deep part towards a shallow part of the ramp slots 40a and 40b along the ramp slots 40a and 40b, and the distance between the ramp plate part 36 and the ramp plate 39 is expanded. The piston 10a is pressed to the rotor side via the thrust needle bearing 34, the adjusting nut 24, and the adjusting spindle 20a. As in the case of the service brake mentioned above, the linings of the two pads 3a and 4a are pressed against both side surfaces of the rotor 1a, and the vehicle is braked. The adjusting mechanism 12a will not operate when the parking brake is operated.

The Second Example of Typical Embodiments

Figure 10:
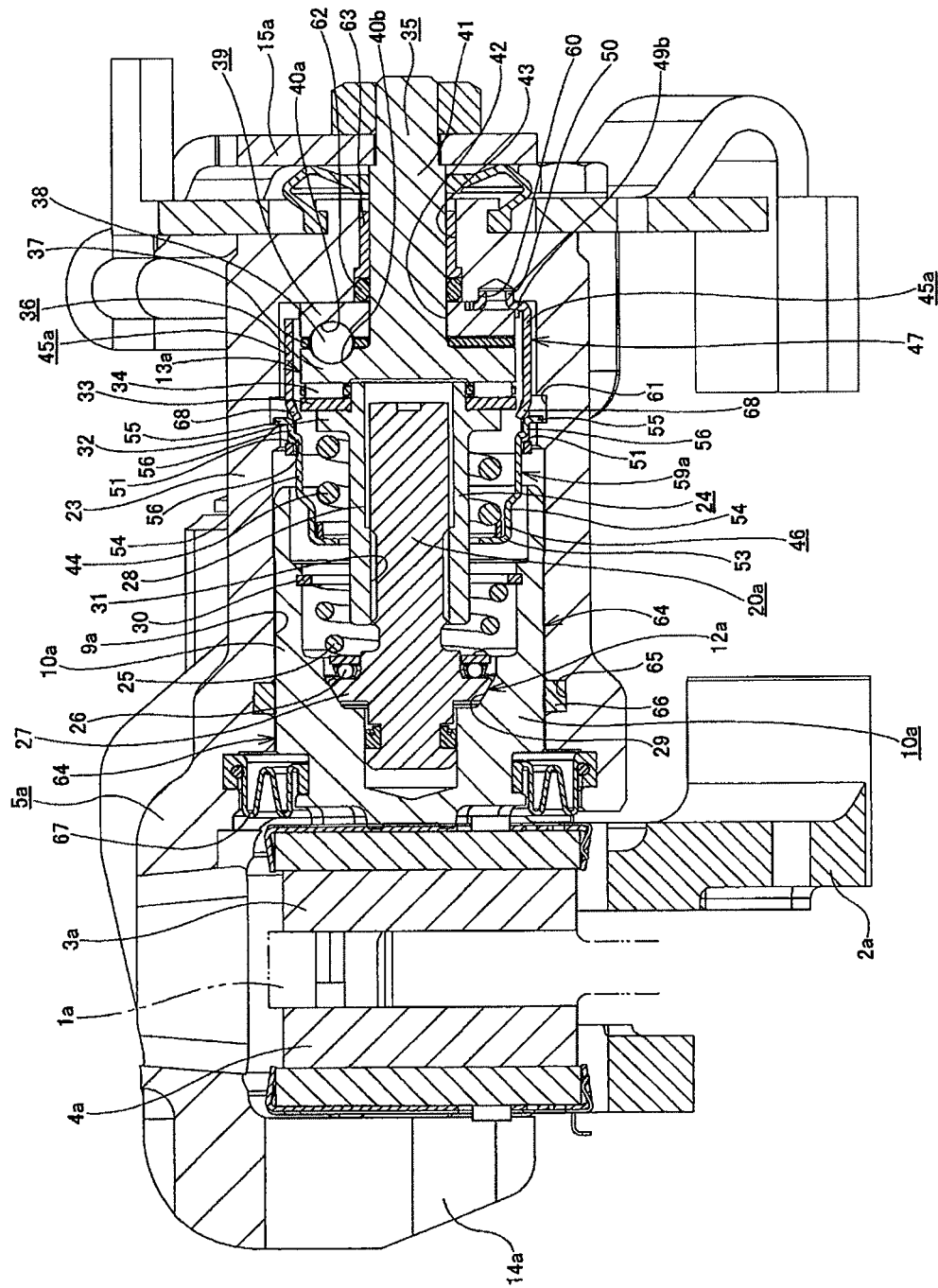
FIG. 10 is a sectional view of a virtual plane containing the central axis of a rotor which shows the second example of embodiments of the invention.
Figure 11:
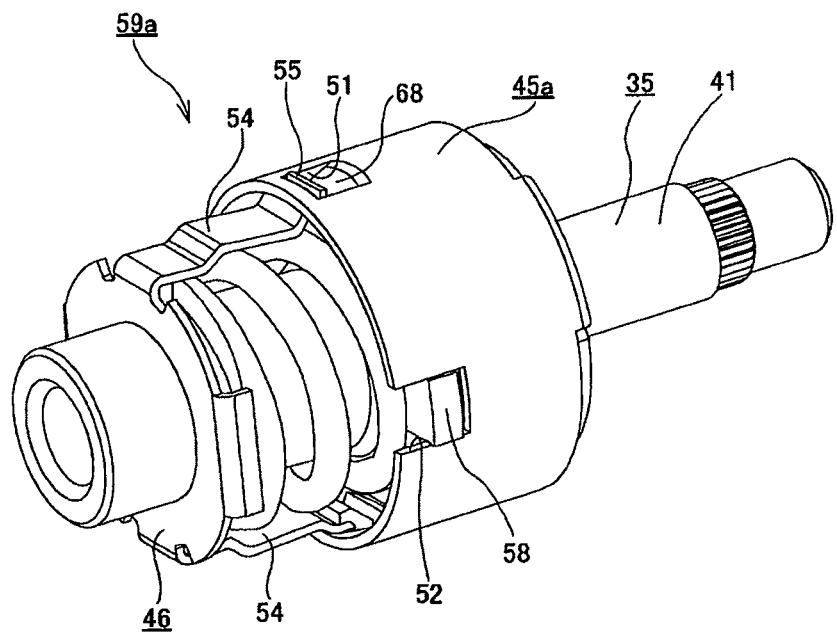
Figure 11:
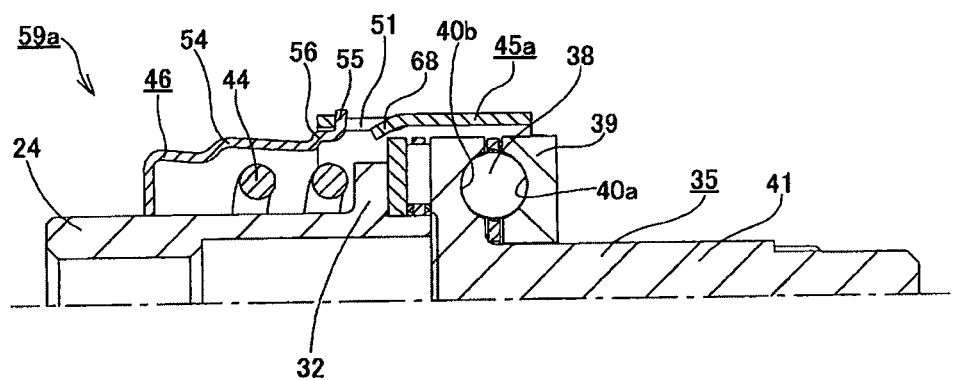
Figure 12:
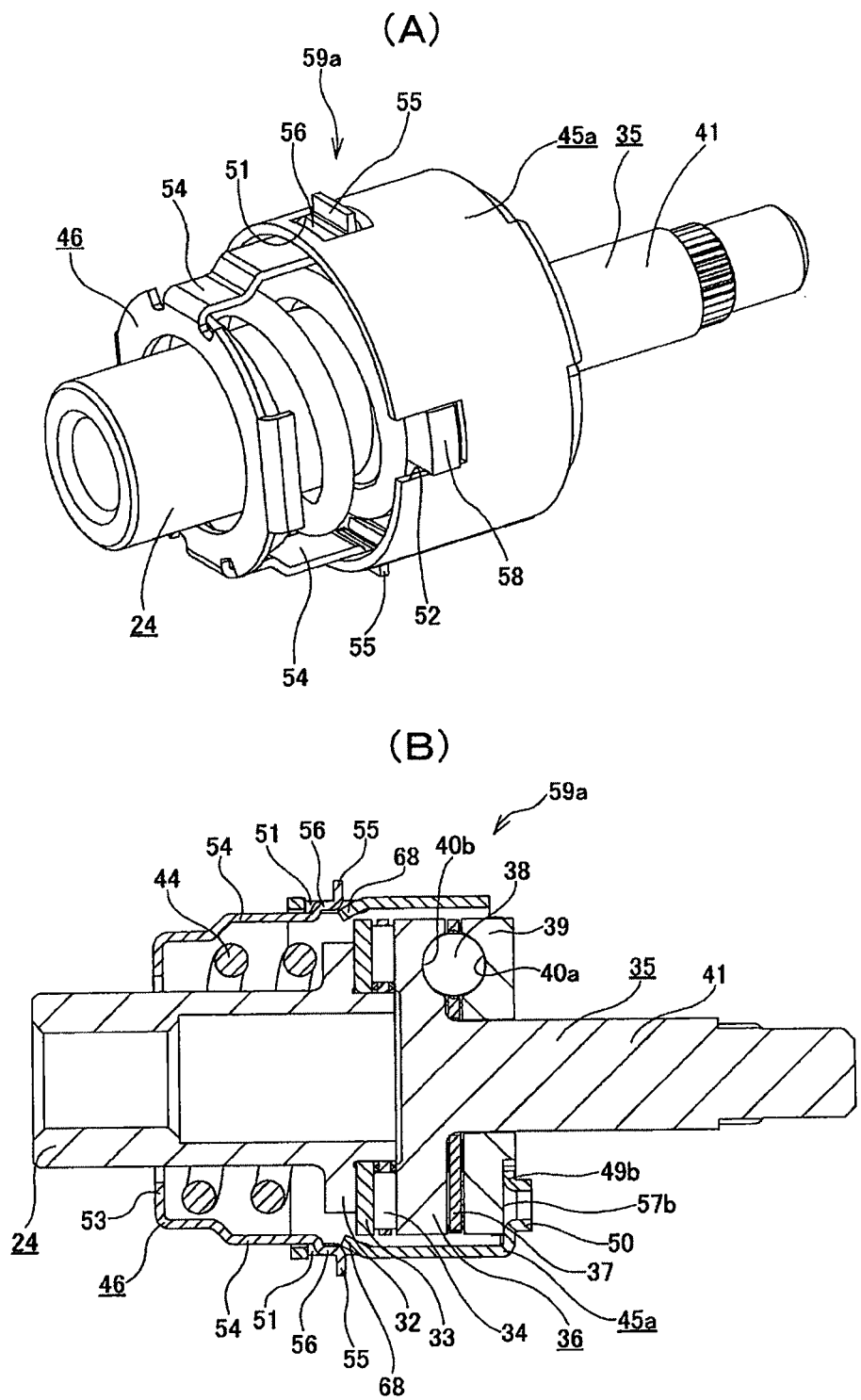
Figure 13:
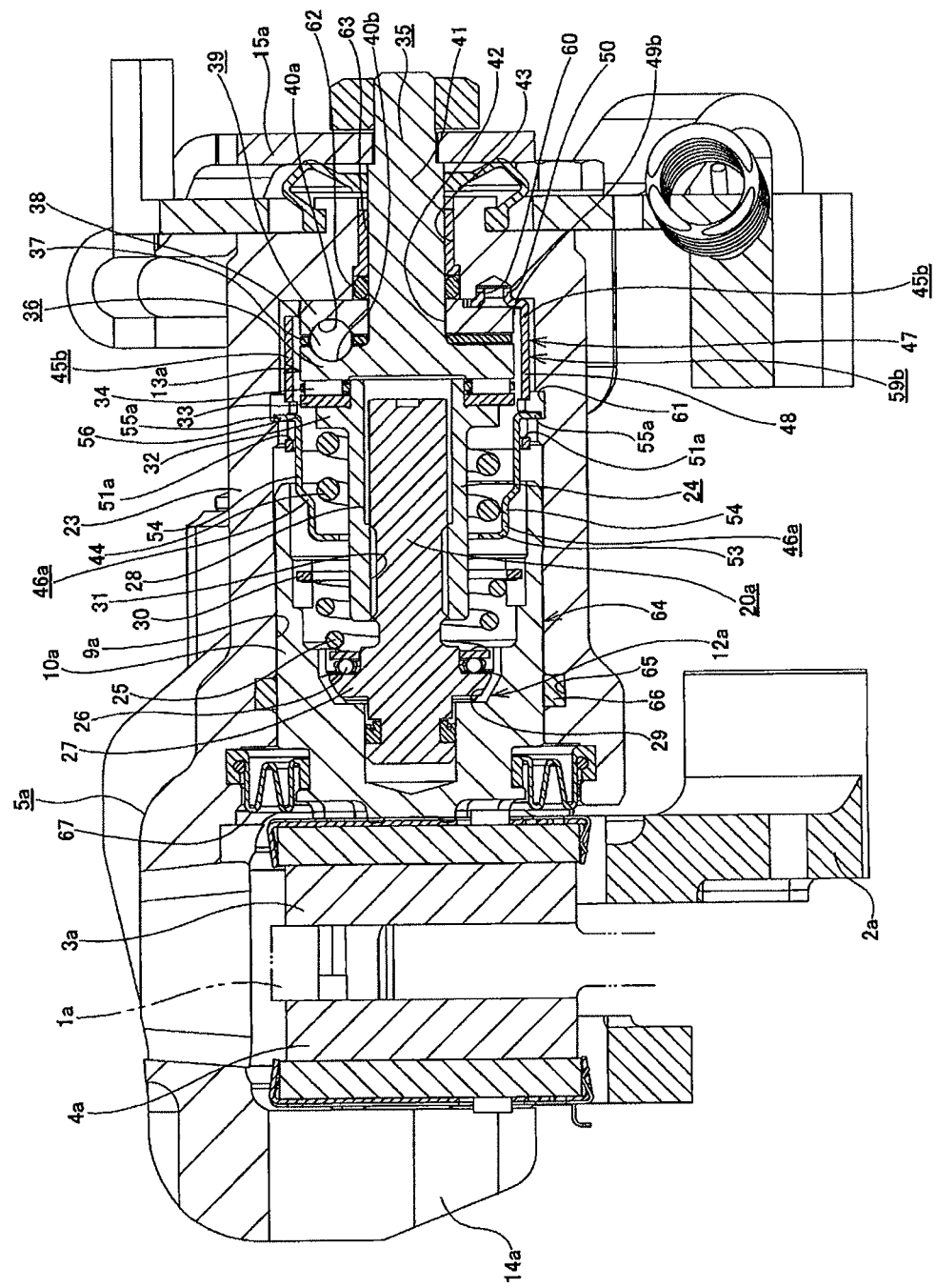
FIG. 13 is a sectional view of a virtual plane containing the central axis of a rotor which shows the third example of embodiments of the invention.
Figure 14:
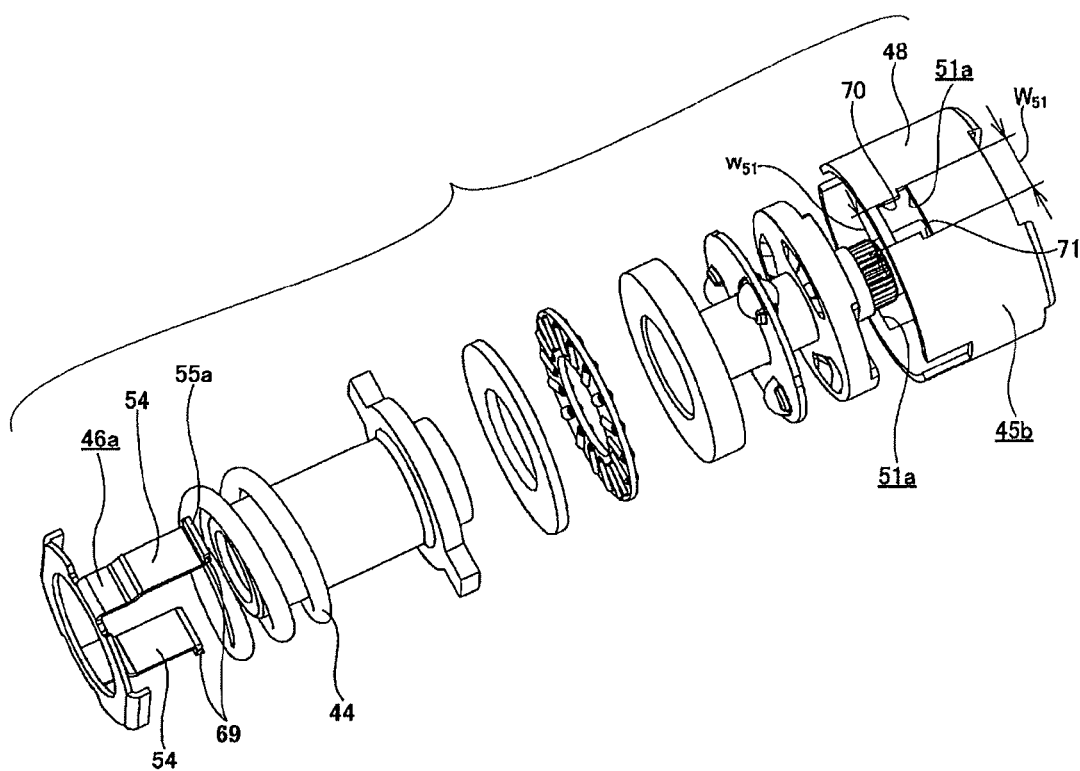
FIG. 14 is an exploded perspective view which is seen from the rotor side and which shows a sub-assembly unit which combines beforehand components that are installed to the inner part of a cylindrical space.
Figure 15:
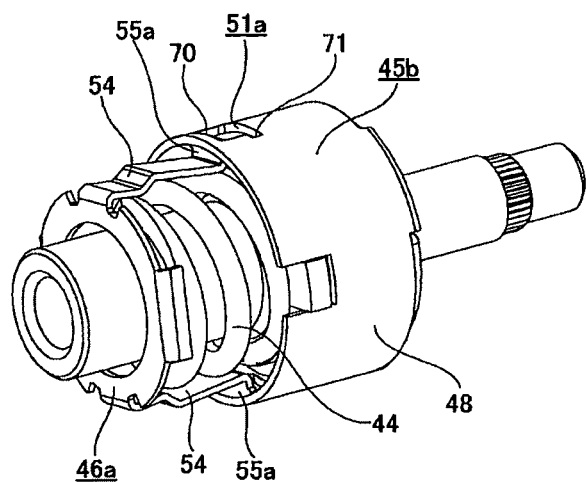
Figure 15:
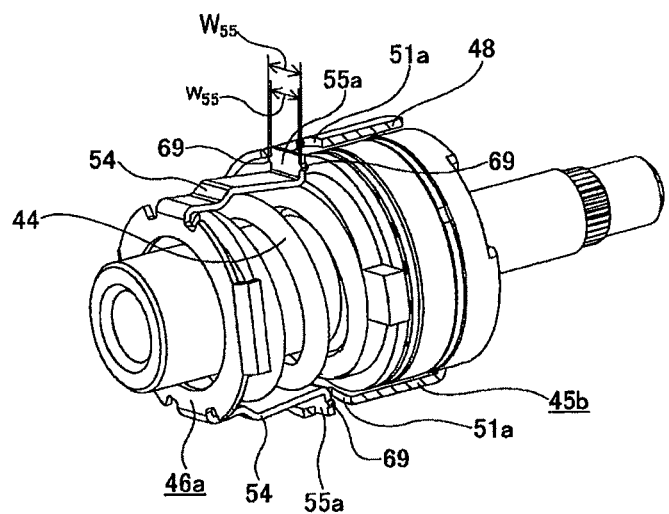
Figure 16:
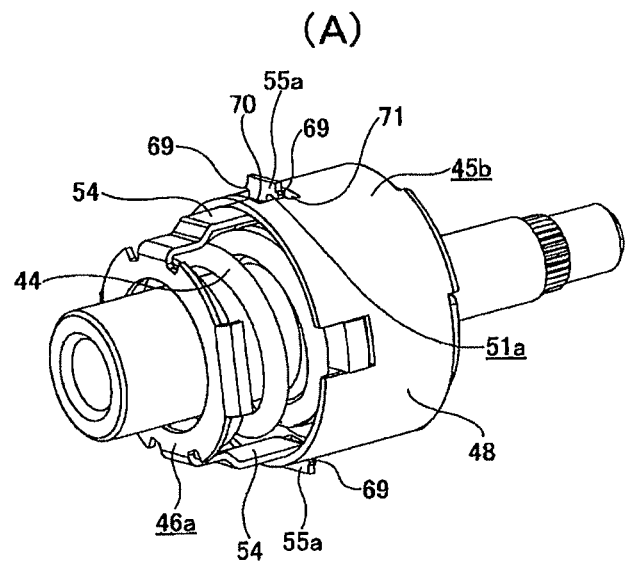
Figure 16:
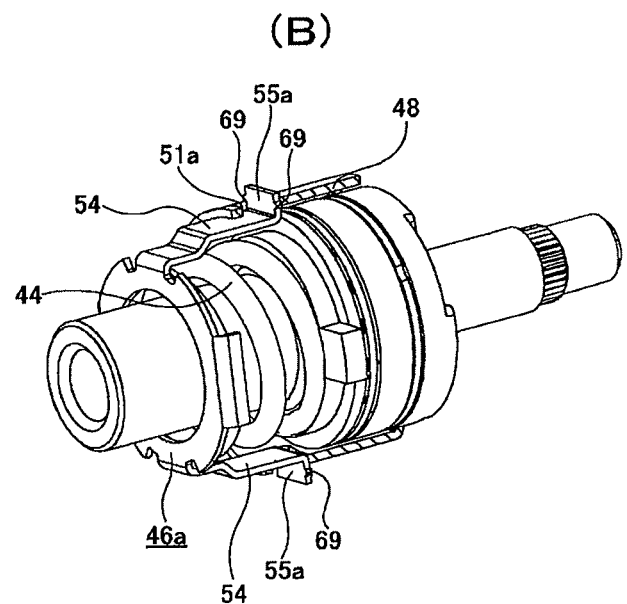
Figure 17:
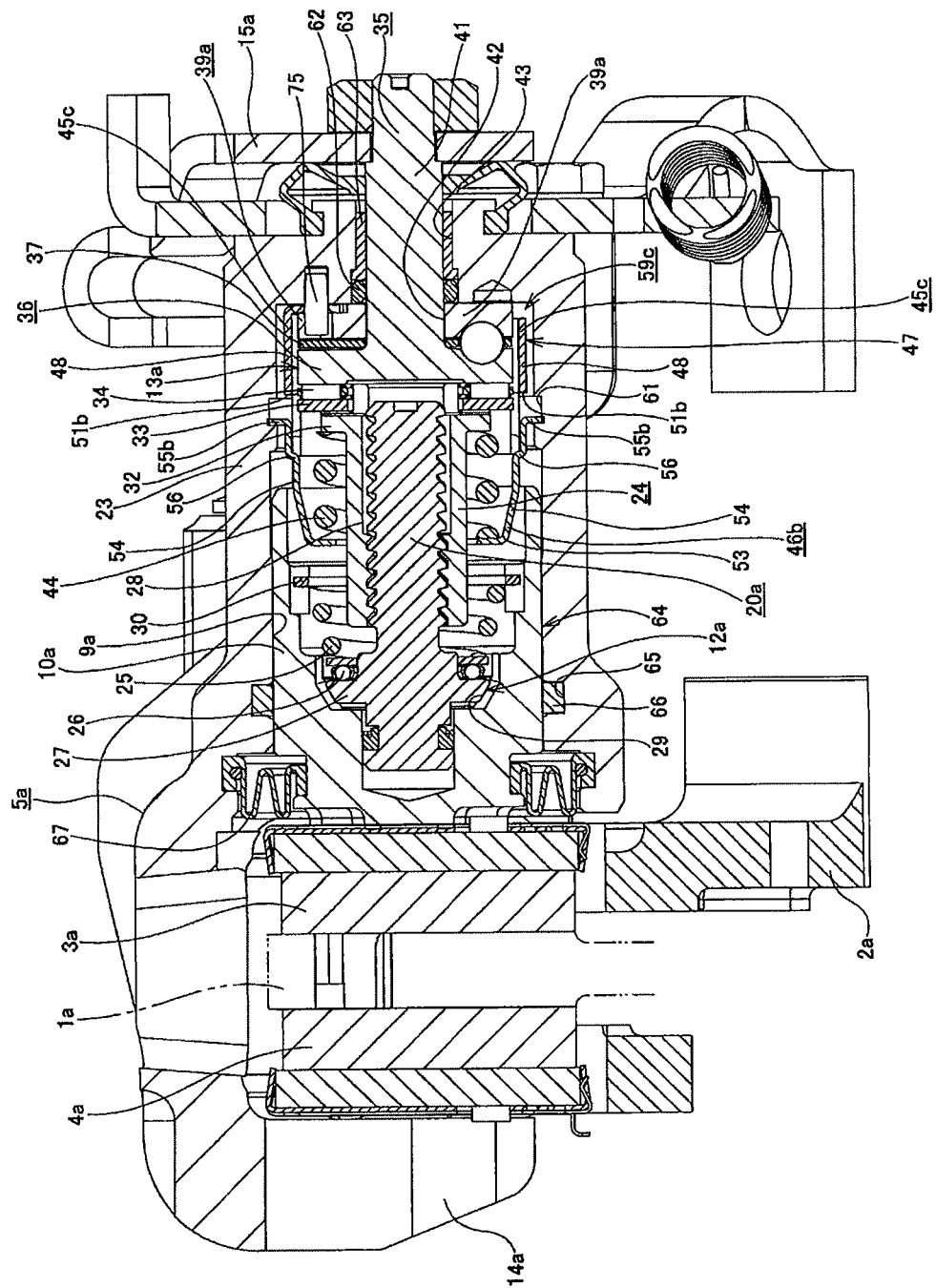
FIG. 17 is a sectional view of a virtual plane containing the central axis of a rotor which shows the fourth example of embodiments of the invention.
Figure 18:
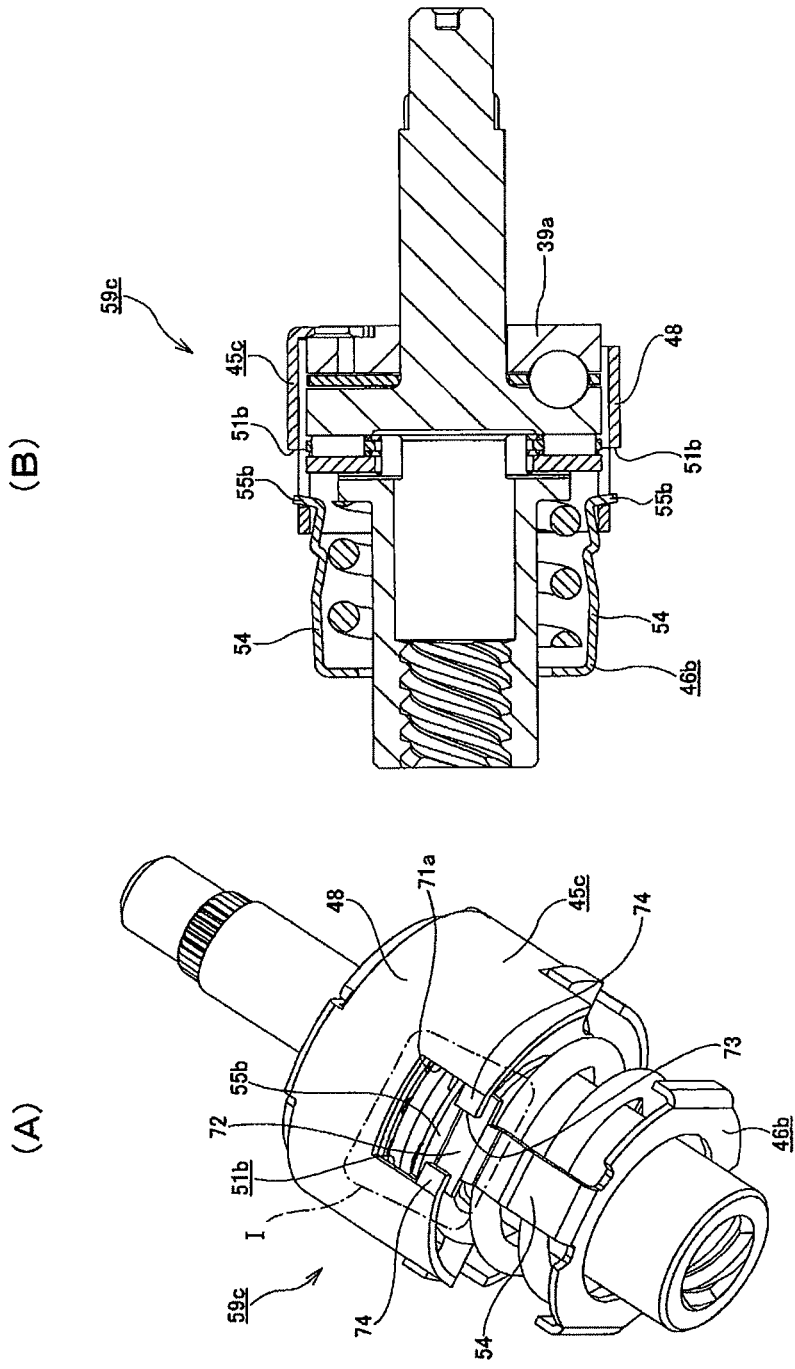
Figure 19:
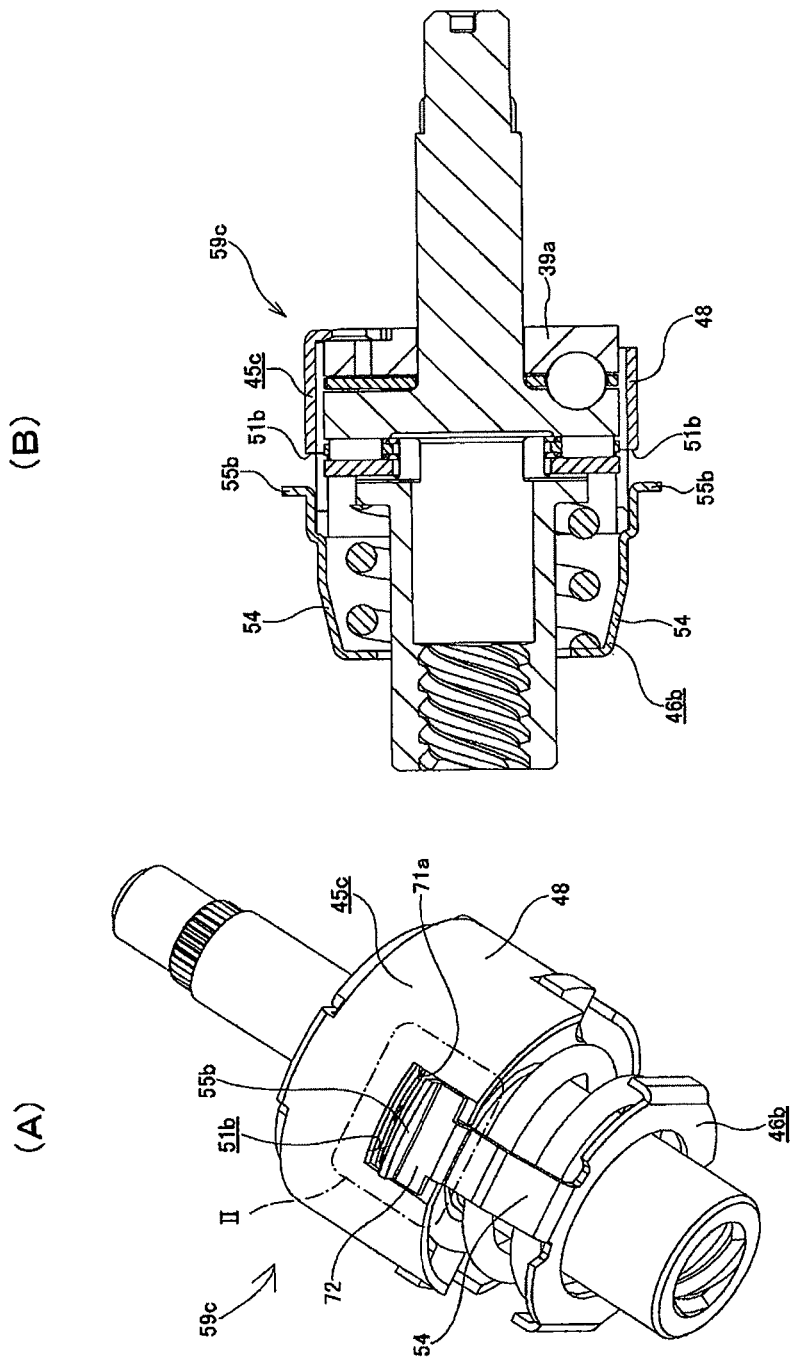
Figure 20:
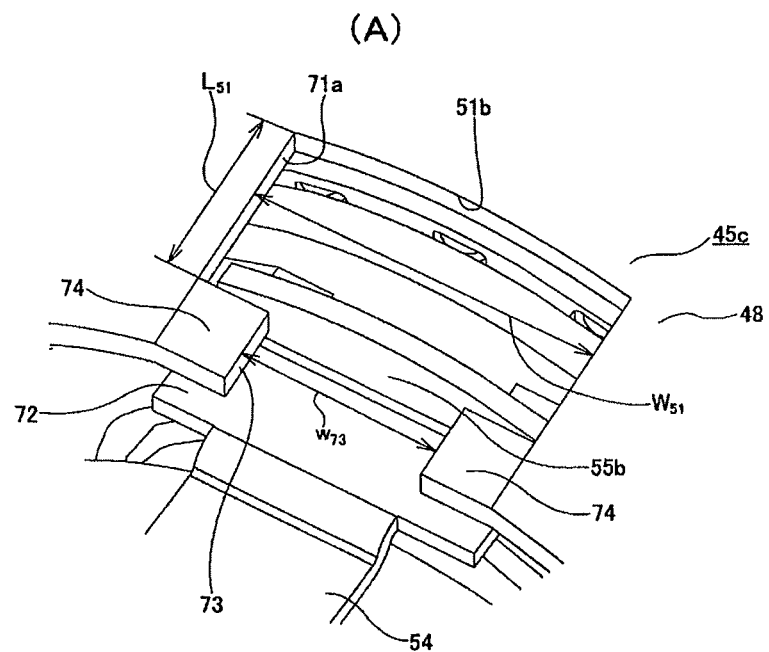
FIG. 20(A) is an I-part enlarged figure of FIG. 18 (A)
FIG. 20(B) is an II-part enlarged figure of FIG. 19(A).
Figure 20:
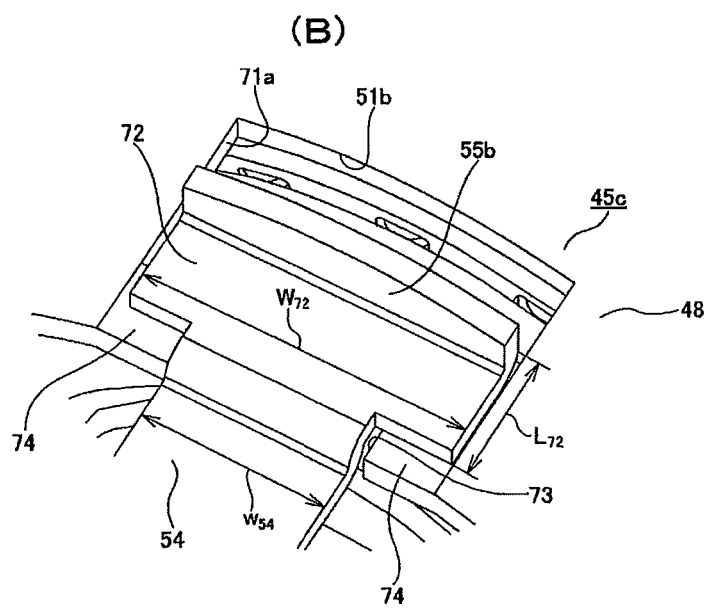
Figure 21:
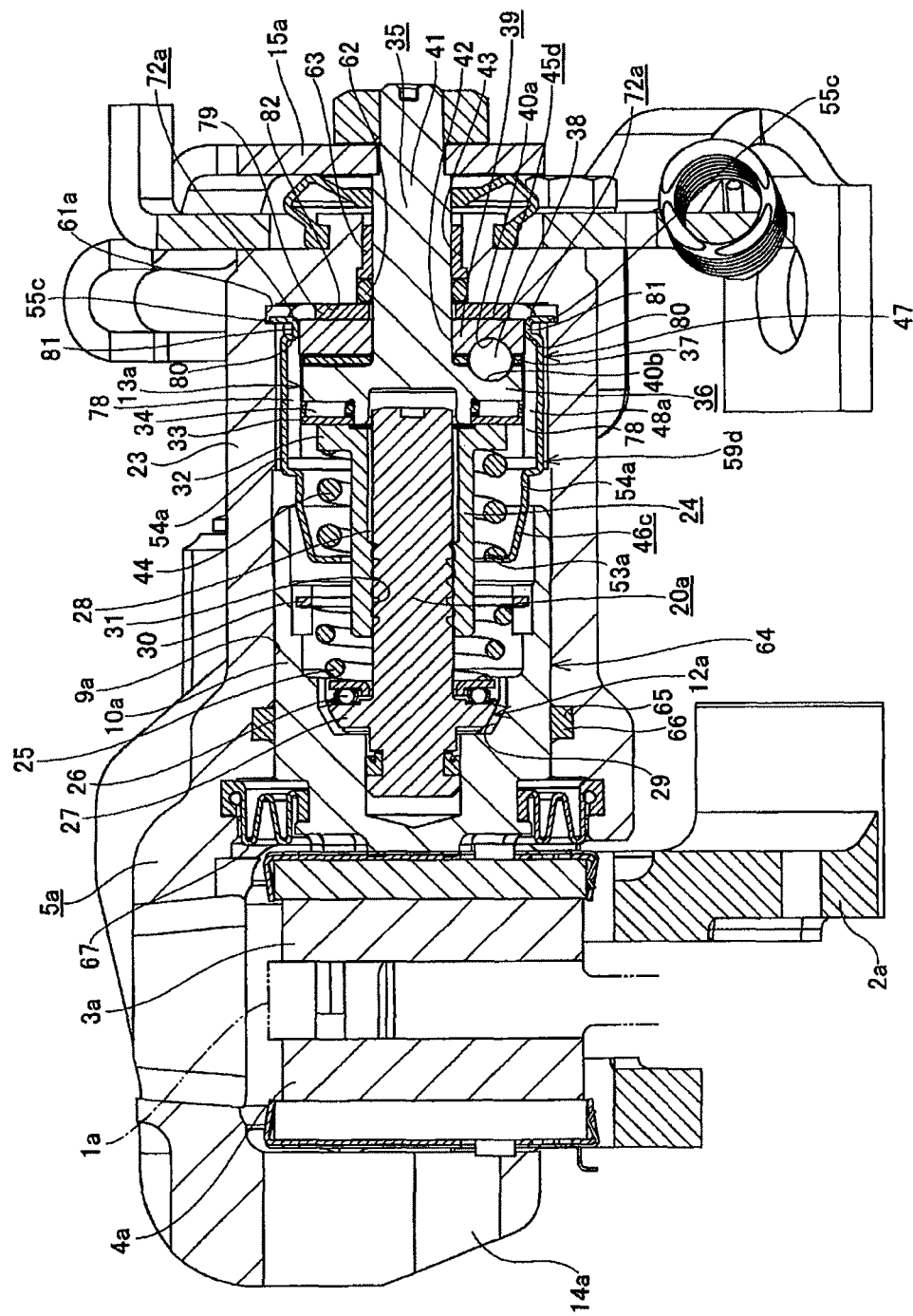
FIG. 21 is a sectional view of a virtual plane containing the central axis of a rotor which shows the fifth example of embodiments of the invention.
Figure 22:
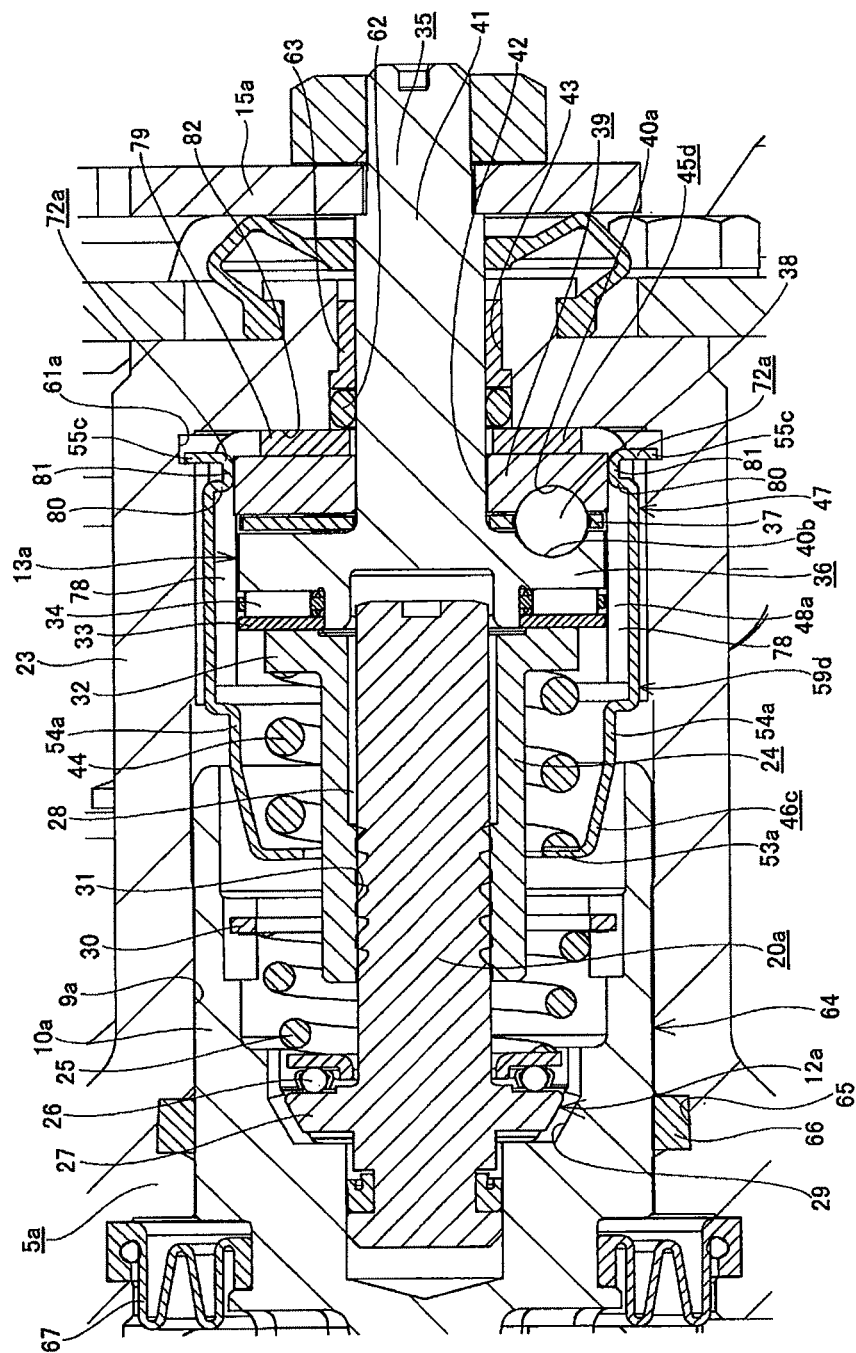
FIG. 22 is an expanded sectional view of the right half part and the central part of FIG. 21.

FIGS. 10 to 12(B) show the second example of the typical embodiments of the invention. In this example, pressing plates 68 and 68 are formed at the anti-rotor side ends of the two ends in the axial direction of a pair of lock holes 51 and 51, which are formed in the anti-rotor side case 45a. The pressing plates 68 and 68 are bended inwards in the radial direction of the anti-rotor side case 45a, and extend towards the rotor side case 46. For the structure of this example, when the anti-rotor side assembly 59a is assembled but not incorporated into the cylindrical space 9a of the caliper 5a, the relation of the components, as shown in FIGS. 11(A) and (B), is the same as that in the first example of the embodiments mentioned above. In contrast, in order to assemble and fix the anti-rotor side auxiliary assembly 59a into the cylindrical space 9a, when the steps 56 and 56 of the pair of resilient arms 54 and 54 provided at the rotor side case 46 enter into the two lock holes 51 and 51, as shown in FIGS. 10 and 12(A) and 12(B), the front ends of the two resilient arms 54 and 54 advance to the outside of the two pressing plates 68 and 68 in the radial direction of the anti-rotor side case 45a. In this state, the two lock claws 55 and 55 formed at the front ends of the two resilient arms 54 and 54 are prevented from being displaced in the pulling out direction (inwards in the radial direction of the cylindrical space 9a) from the lock concave 61 formed on the inner peripheral surface of the cylindrical space 9a.

According to the structure of this example, after the anti-rotor side auxiliary assembly 59a is inserted into the inner part of the cylindrical space 9a, the front ends of the two lock claws 55 and 55 can be definitely prevented from being uninstalled from the lock concave 61. Therefore, after the anti-rotor side auxiliary assembly 59a is inserted into the inner part of the cylindrical space 9a, the anti-rotor side auxiliary assembly 59a can be prevented from unintentionally being uninstalled from the cylindrical space 9a, either before or after the rotor side auxiliary assembly 64 which contains the piston 10a and the like is assembled into the part of the cylindrical space 9a that is close to the opening.

Since the structures and operations of other components are the same as those of the first example of the typical embodiments mentioned above, the same symbols are given to equivalent components and their descriptions are omitted.

The Third Example of Typical Embodiments

FIGS. 13 to 16 (B) show the third example of the typical embodiments of the invention. In this example, a pair of lock claws 55a and 55a which are provided at the anti-rotor side ends of the rotor side case 46a are formed by bending the front ends of a pair of resilient arms 54 and 54 outwards in the radial direction. In particular, in this example, protrusions 69 and 69 are formed at mutually matched parts (at positions corresponds mutually in the radial direction of the rotor side case 46a) of the two side edges of the two lock claws 55a and 55a in the middle parts of the two lock claws 55a and 55a, respectively, and as shown in (B) of FIG. 15, the width $W_{55}$ of the concerned parts is larger than the width $w_{55}$ of the front ends ($W_{55}>w_{55}$, and the concerned parts are assumed as wide parts). A pair of lock holes 51a and 51a are formed at the anti-rotor side case 45b. As show in FIG. 14, a narrow part 70 whose width $w_{51}$ is small is formed from the rotor side end to the middle part of each of the lock holes 51a and 51a in the axial direction, and a wide parts 71 whose width $W_{51}$ is large is formed at the anti-rotor side end of each of the lock holes 51a and 51a in the axial direction. The width $w_{51}$ of the narrow parts 70 is smaller than the width $W_{55}$ of the parts in the middle parts of the two lock claws 55a and 55a where the protrusions 69 and 69 are formed, and is larger than the width $w_{55}$ of the front ends ($W_{55}>w_{51}>w_{55}$). On the other hand, the width $W_{51}$ of the wide parts 71 is larger than the width $W_{55}$ of the parts in the middle parts of the two lock claws 55a and 55a where the protrusions 69 and 69 are formed ($W_{51}>W_{55}$). Therefore, the narrow parts 70 allow the front ends of the two lock claws 55a and 55a to pass, but do not allow the wide parts where the protrusions 69 and 69 are formed to pass, and the wide parts 71 also allow the wide parts to pass.

For the structure of this example, when the anti-rotor side assembly 59b is assembled but not incorporated into the cylindrical space 9a of the caliper 5a, as shown in FIGS. 15(A) and 15(B), the front ends of the two lock claws 55a and 55a are engaged with the narrow parts 70. Namely, the wide parts where the protrusions 69 and 69 are formed are engaged with two side edges of the narrow parts 70, and the front ends of the two lock claws 55a and 55a and the rotor side edges of the two lock holes 51a and 51a are engaged so that the anti-rotor side case and the rotor side case 45b and 46a will not be separated. The function in this state is the same as that of the first example of the typical embodiments mentioned above. On the other hand, in order to assemble and fix the anti-rotor side auxiliary assembly 59b into the cylindrical space 9a, when the preload spring 44 is elastically compressed and the rotor side case 46a is pushed into the cylindrical space 9a, the wide parts where the protrusions 69 and 69 are formed will pass the wide parts 71, and be displaced outwards in the radial direction beyond the peripheral wall 48 of the anti-rotor side case 45b. As a result, the front ends of the two lock claws 55a and 55a fully protrude from the outer peripheral surface of the peripheral wall 48, and engage with the lock concave 61 formed on the inner peripheral surface of the cylindrical space 9a.

In this state, if the force which is pressed on the rotor side case 46a to the anti-rotor side is released, the rotor side case 46a will slightly return to the rotor side due to the elasticity of the preload spring 44, and the wide parts where the protrusions 69 and 69 are formed will move to the rotor side beyond the wide parts 71. In this state, the two lock claws 55a and 55a will not be displaced inwards in the radial direction of the rotor side case 46a. Therefore, by using the structure of this example, similarly to the structure of the second example of the typical embodiments mentioned above, after the anti-rotor side auxiliary assembly 59b is inserted into the inner part of the cylindrical space 9a, the anti-rotor side auxiliary assembly 59b can be prevented from unintentionally being uninstalled from the cylindrical space 9a, either before or after the rotor side auxiliary assembly 64 which contains the piston 10a and the like is assembled into the part of the cylindrical space 9a that is close to the opening. Since the structures and operations of other components are the same as those of the first example of the typical embodiments mentioned above, the same symbols are given to equivalent components and their descriptions are omitted.

The Fourth Example of Typical Embodiments

FIGS. 17 to 20(B) show the fourth example of the typical embodiments of the invention. In this example, a pair of lock claws 55b and 55b which are provided at the anti-rotor side ends of the rotor side case 46b are formed by bending the front ends of a pair of resilient arms 54 and 54 outwards in the radial direction. In particular, in this example, the two lock claws 55b and 55b are formed to be wider than those in the first to third examples described previously, and a pair of lock holes 51b and 51b which are formed at two positions opposite to each other in the diametrical direction at the rotor side end of the peripheral wall 48 of the anti-rotor side case 45c opens at the rotor side end edge of the peripheral wall 48.

Namely, in this example, as shown in FIGS. 20(A) and 20(B), wide parts 72 are formed at the front ends of a pair of resilient arms 54 and 54 which are provided to extend to the anti-rotor side from two positions opposite to each other in the diametrical direction at the outer peripheral edges of the rotor side case 46b, and the width $W_{72}$ of the wide parts 72 in the circumferential direction of the rotor side case 46b is larger than the width $w_{54}$ of the two resilient arms 54 and 54 in the same direction ($W_{72} > w_{54}$). The anti-rotor side half parts of the wide parts 72 are used as two lock claws 55b and 55b by being bended at an almost right angle outwards in the radial direction of the rotor side case 46b. The two lock holes 51b and 51b, when seen from the radial direction, are T-shaped, and have notches whose central parts in the circumferential direction of the peripheral wall 48 open at the rotor side end edges of the peripheral wall 48. The width $w_{73}$ of communication parts 73, which are the rotor side half parts of the two lock holes 51b and 51b, and open at the rotor side end edge of the peripheral wall 48, is smaller than the width $W_{72}$ of the wide parts 72, and is larger than the width $w_{54}$ of the two resilient arms 54 and 54 ($W_{72} > w_{73} > w_{54}$). The width $W_{51}$ of wide parts 71a which are the anti-rotor side half parts of the two lock holes 51b and 51b is larger than the width $W_{72}$ of the wide parts 72, and the length $L_{51}$ of the wide parts 71a in the axial direction is larger than the length $L_{72}$ of the wide parts 72 ($W_{51} > W_{72}$, $L_{51} > L_{72}$).

For the structure of this example, when the anti-rotor side assembly 59c is assembled but not incorporated into the cylindrical space 9a of the caliper 5a, as shown in FIGS. 18(A), 18(B) and 20(A), the wide parts 72 of the front ends of the two resilient arms 54 and 54 are arranged at the inner sides of protrusion plates 74 and 74 which are at both sides of the communication parts 73 in the radial direction of the anti-rotor side case 45c. The rotor side surfaces of the two lock claws 55b and 55b are engaged with the anti-rotor side end edges of the two protrusion plates 74 and 74. In this state, the anti-rotor side case 45c and the rotor side case 46b are coupled inseparably. The protrusion amount of the two lock claws 55b and 55b from the outer peripheral surface of the anti-rotor side case 45c can be kept small. The function in this state is the same as that of the first example of the typical embodiments mentioned above.

On the other hand, in order to assemble and fix the anti-rotor side auxiliary assembly 59c into the cylindrical space 9a, when the preload spring 44 is elastically compressed and the rotor side case 46b is pushed into the cylindrical space 9a, the two wide parts 72 and 72 provided at the front ends of the two resilient arms 54 and 54 will reach the anti-rotor side half parts of the two lock holes 51b and 51b. The two wide parts 72 and 72 pass the anti-rotor side half parts of the two lock holes 51b and 51b, and are displaced outwards in the radial direction beyond the peripheral wall 48 of the rotor side case 46b. As a result, the front ends of the two lock claws 55b and 55b fully protrude from the outer peripheral surface of the peripheral wall 48, and engage with the lock concave 61 formed on the inner peripheral surface of the cylindrical space 9a.

In this state, if the force which is pressed on the rotor side case 46b to the anti-rotor side is released, the rotor side case 46b will slightly return to the rotor side due to the elasticity of the preload spring 44, and the two lock claws 55b and 55b will engage with the lock concave 61 formed in the inner peripheral surface of the cylindrical space 9a. At the same time, both ends of the two wide parts 72 and 72 which are provided at the front ends of the two resilient arms 54 and 54 move to the outside of the protrusion plates 74 and 74 in the radial direction of the anti-rotor side case 45c. In this state, the two lock claws 55b and 55b which are formed at the anti-rotor side end edges of the two wide parts 72 and 72 will not be displaced inwards in the radial direction of the rotor side case 46b. Therefore, by using the structure of this example, similarly to the structures of the second and third examples of the typical embodiments mentioned above, after the anti-rotor side auxiliary assembly 59c is inserted into the inner part of the cylindrical space 9a, the anti-rotor side auxiliary assembly 59c can be prevented from unintentionally being uninstalled from the cylindrical space 9a, either before or after the rotor side auxiliary assembly 64 which contains the piston 10a and the like is assembled into the part of the cylindrical space 9a that is close to the opening. In this example, the rotation stopper of the anti-rotor side case 45c and the ramp plate 39a is achieved with a lock pin 75. However, the rotation stopper structure of this part can also be formed like the first to third examples of the typical embodiments mentioned above. Conversely, the rotation stopper structures in the above mentioned first to third examples can be the same as that in this example.

Since the structures and operations of other components are the same as those of the first example of the typical embodiments mentioned above, the same symbols are given to equivalent components and their descriptions are omitted.

The Fifth Example of Typical Embodiments

FIGS. 21 to 29(B) show the fifth example of the typical embodiments of the invention. In this example, a pair of lock claws 55c and 55c which are provided at the anti-rotor side ends of the rotor side case 46c engage/disengage with the anti-rotor side end edge of a peripheral wall 48a which forms the anti-rotor side case 45d. Thus, in this example, the peripheral wall 48a has an incomplete cylindrical shape. That is, a pair of slits 78 and 78 are formed at two positions of the peripheral wall 48a opposite to each other by 180 degrees in the circumferential direction along the axial direction of the anti-rotor side case 45d, and communicate two end edges of the peripheral wall 48a in the axial direction, respectively. Two parts of the peripheral wall 48a which are divided in the circumferential direction by the two slits 78 and 78 are mutually connected by a bottom plate 79 which is provided at the anti-rotor side end of the anti-rotor side case 45d. Therefore, irrespective of the two slits 78 and 78, the two parts of the peripheral wall 48a which are beside the two slits 78 and 78 in the circumferential direction will not separate, and the position relationship of the two parts will not be changed. In other words, the width of the two slits 78 and 78 in the circumferential direction does not change. However, the bottom plate 79 is not provided with parts that align with the two slits 78 and 78 or parts beside the above parts in the circumferential direction. Therefore, parts of the anti-rotor side end edge of the peripheral wall 48a that are beside the two slits 78 and 78 are exposed in the axial direction.

In this example, the two lock claws 55c and 55c are provided at the front ends of a pair of resilient arms 54a and 54a which extend to the anti-rotor side from two positions at the outer periphery edge of the rotor side case 46c opposite to each other by 180 degrees in the circumferential direction. The width of the two resilient arms 54a and 54a in the circumferential direction is only slightly smaller than the width of the two slits 78 and 78 in the same direction. The lock claws 55c and 55c are formed by bending the anti-rotor side half parts of wide parts 72a and 72a, which are provided at the front ends of the two resilient arms 54a and 54a and whose width in the circumferential direction is larger than the width of the two slits 78 and 78 in the same direction, outwards in the radial direction of the rotor side case 46c. In this example, continuing parts 80 and 80 are provided between the base end edges of the two wide parts 72a and 72a and the front end edges of the two resilient arms 54a and 54a, and are bended inwards in the radial direction of the rotor side case 46c from the front end edges of the two resilient arms 54a and 54a. Base boards 81 and 81 which are the rotor side half parts of the two wide parts 72a and 72a are more inwards in the radial direction of the rotor side case 46c than the front ends of the two resilient arms 54a and 54a. Thus, as described later, when the anti-rotor side auxiliary assembly 59d is assembled, the two resilient arms 54a and 54a will not protrude inwards in the radial direction from the inner peripheral surface of the peripheral wall 48a.

For the structure of this example which is formed of the components as mentioned above, the anti-rotor side auxiliary assembly 59d is assembled by combining the components, and the anti-rotor side auxiliary assembly 59d is further incorporated in the cylindrical space 9a of the caliper 5a. These operations are explained successively.

Figure 23:
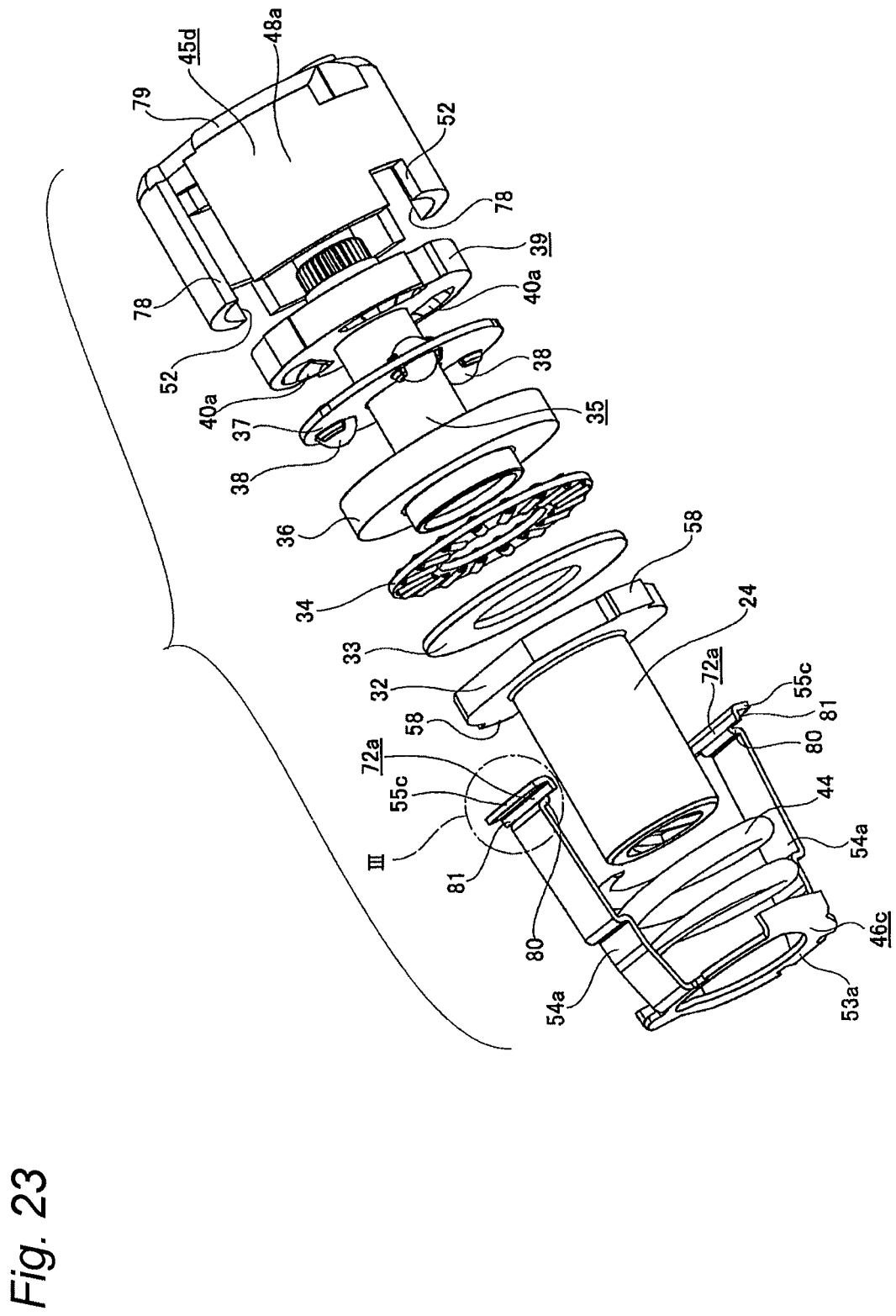
FIG. 23 is an exploded perspective view which is seen from the rotor side and which shows a sub-assembly unit which combines beforehand components that are installed to the inner part of a cylindrical space.
Figure 24:
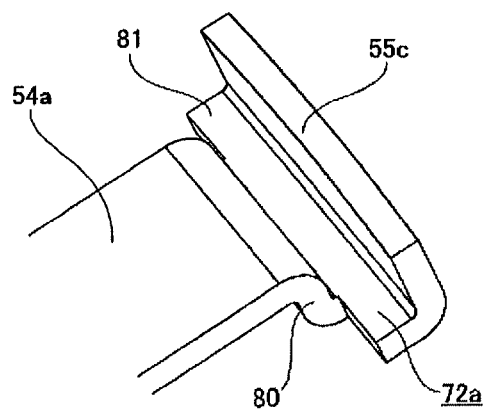
FIG. 24 is an III-part enlarged figure of FIG. 23.
Figure 25:
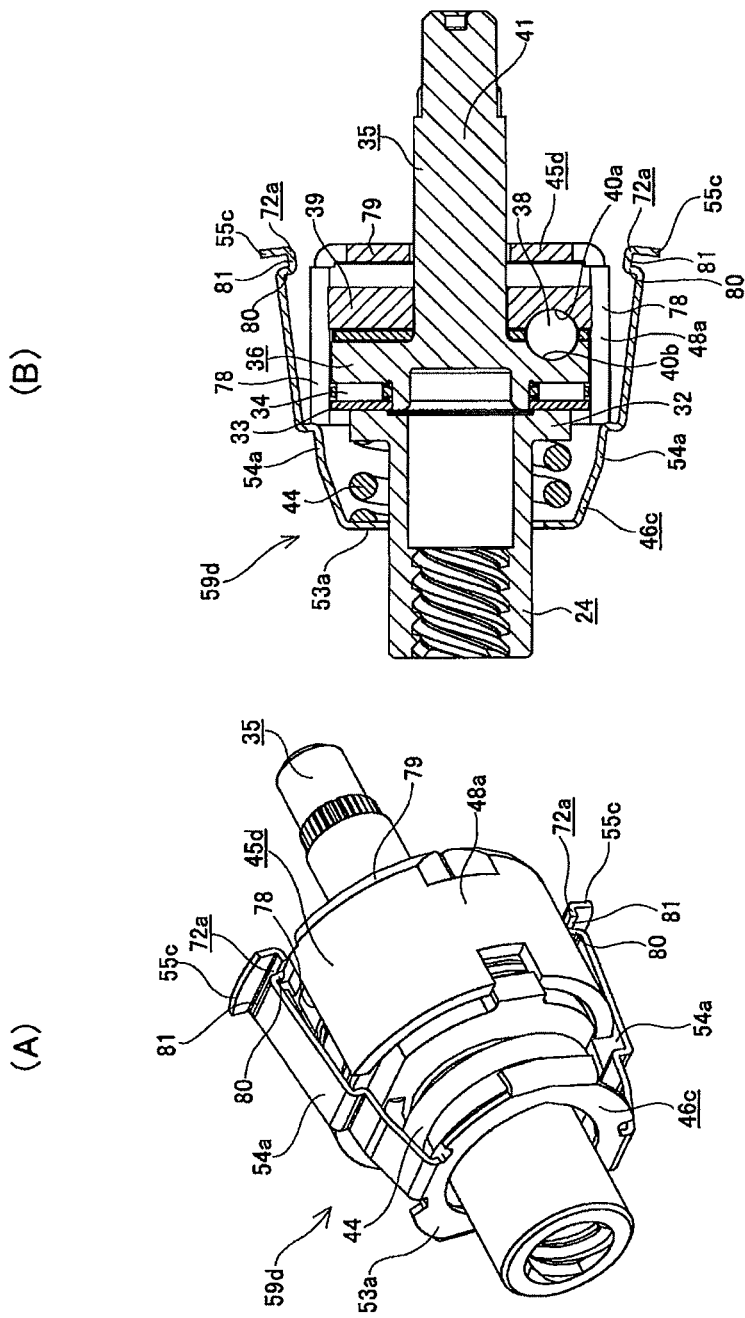
Figure 26:
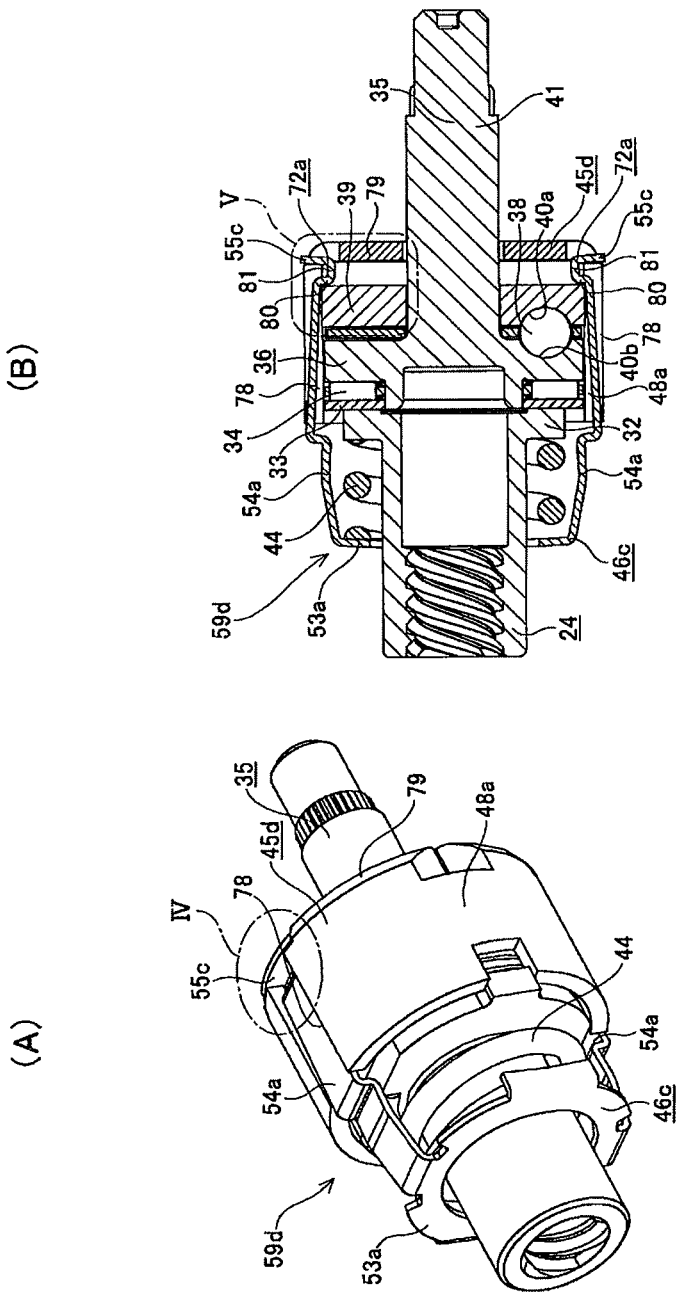
Figure 27:
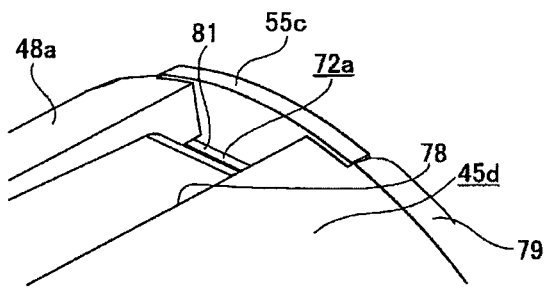
FIG. 27(A) is an IV-part enlarged figure of FIG. 26 (A)
FIG. 27(B) is a V-part enlarged figure of FIG. 26(B).
Figure 27:
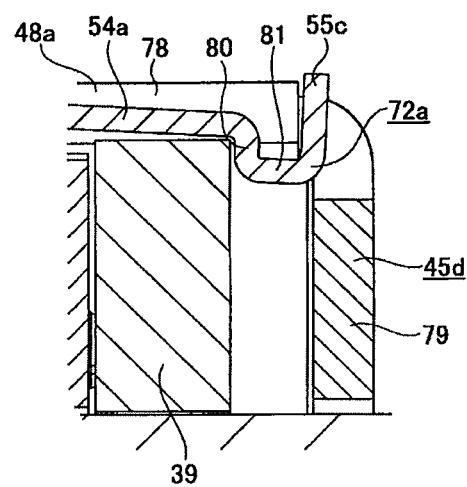
Figure 28:
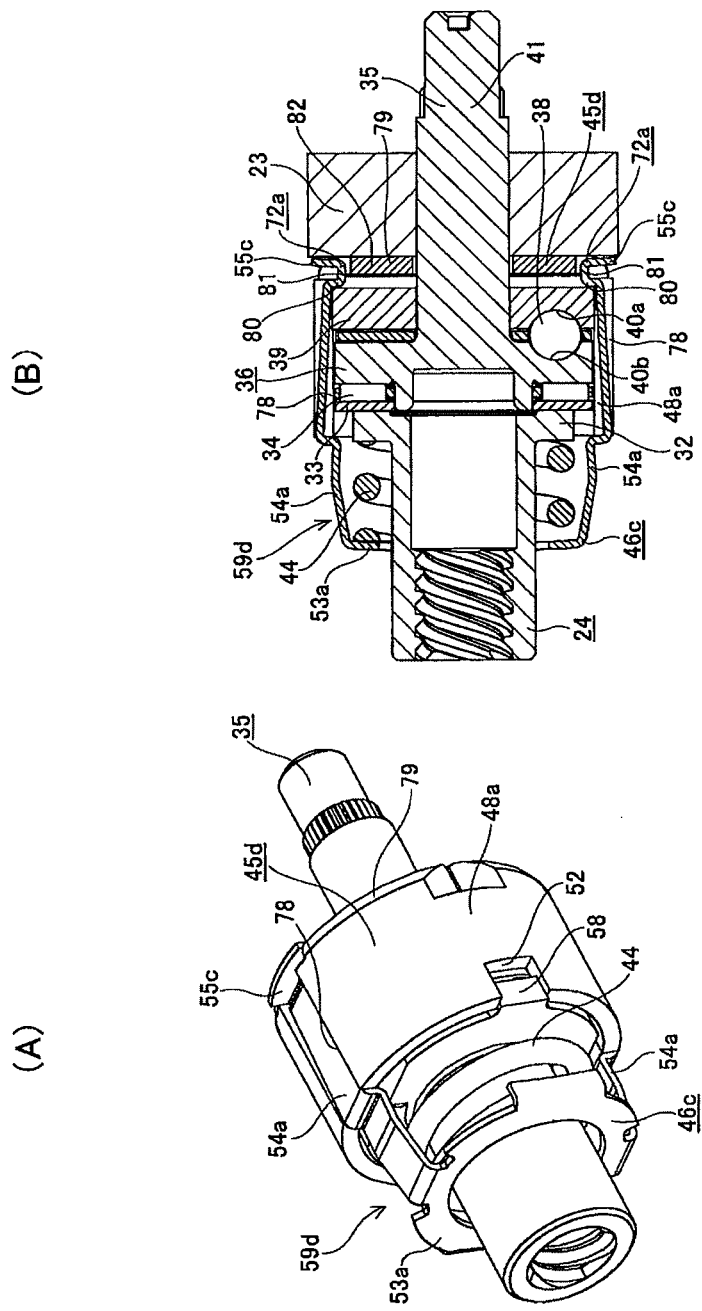
Figure 29:
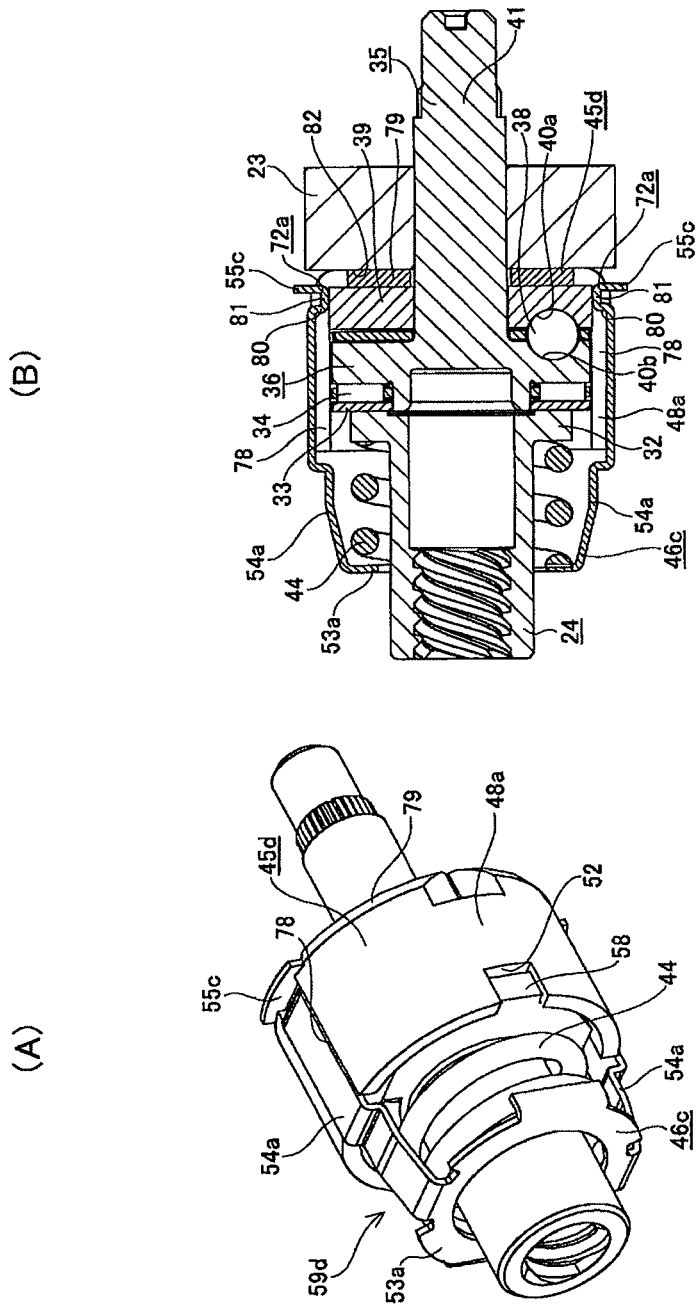
Figure 30:
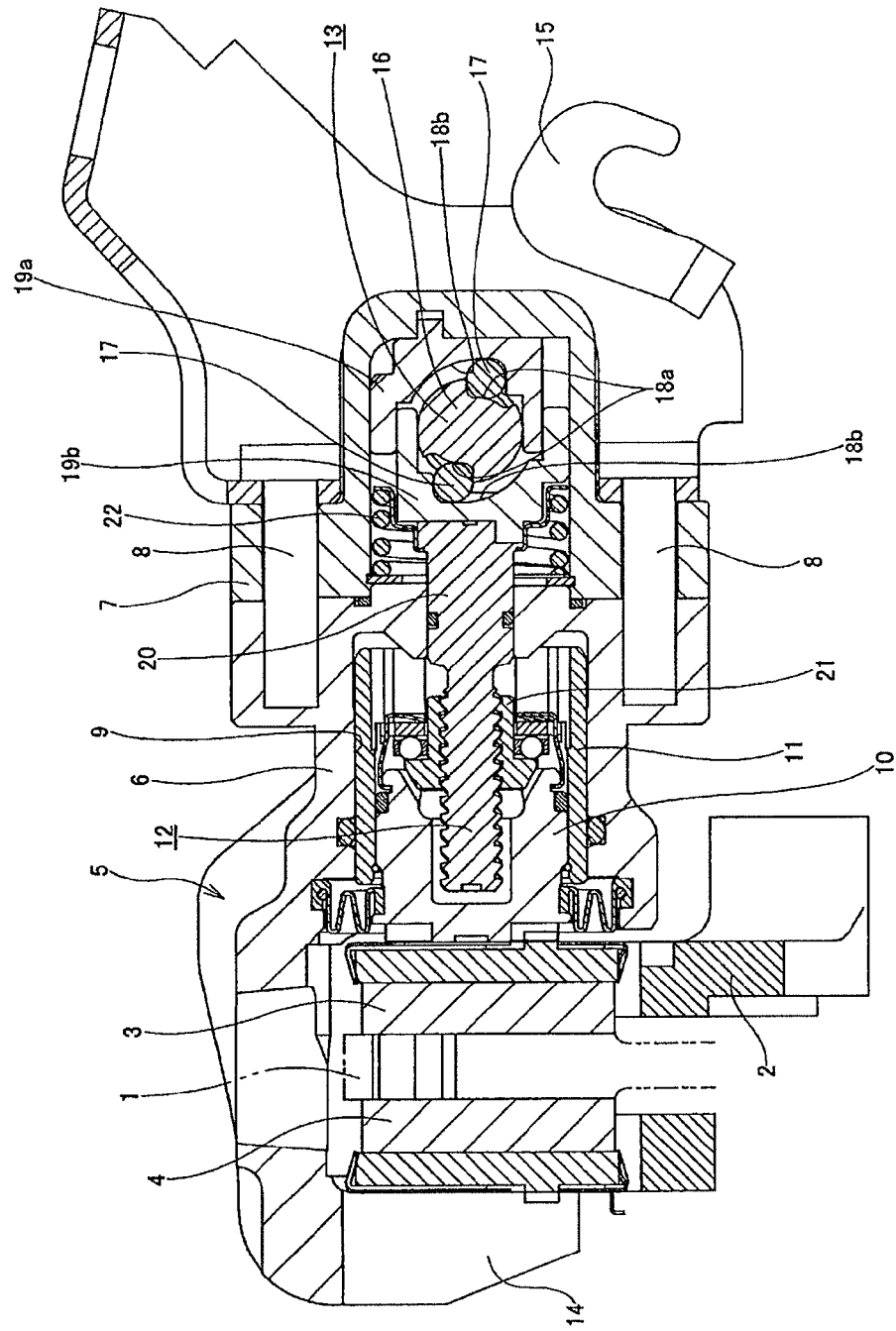
FIG. 30 is a sectional view of a virtual plane containing the central axis of a rotor which shows one example of conventional structures.
Figure 31:
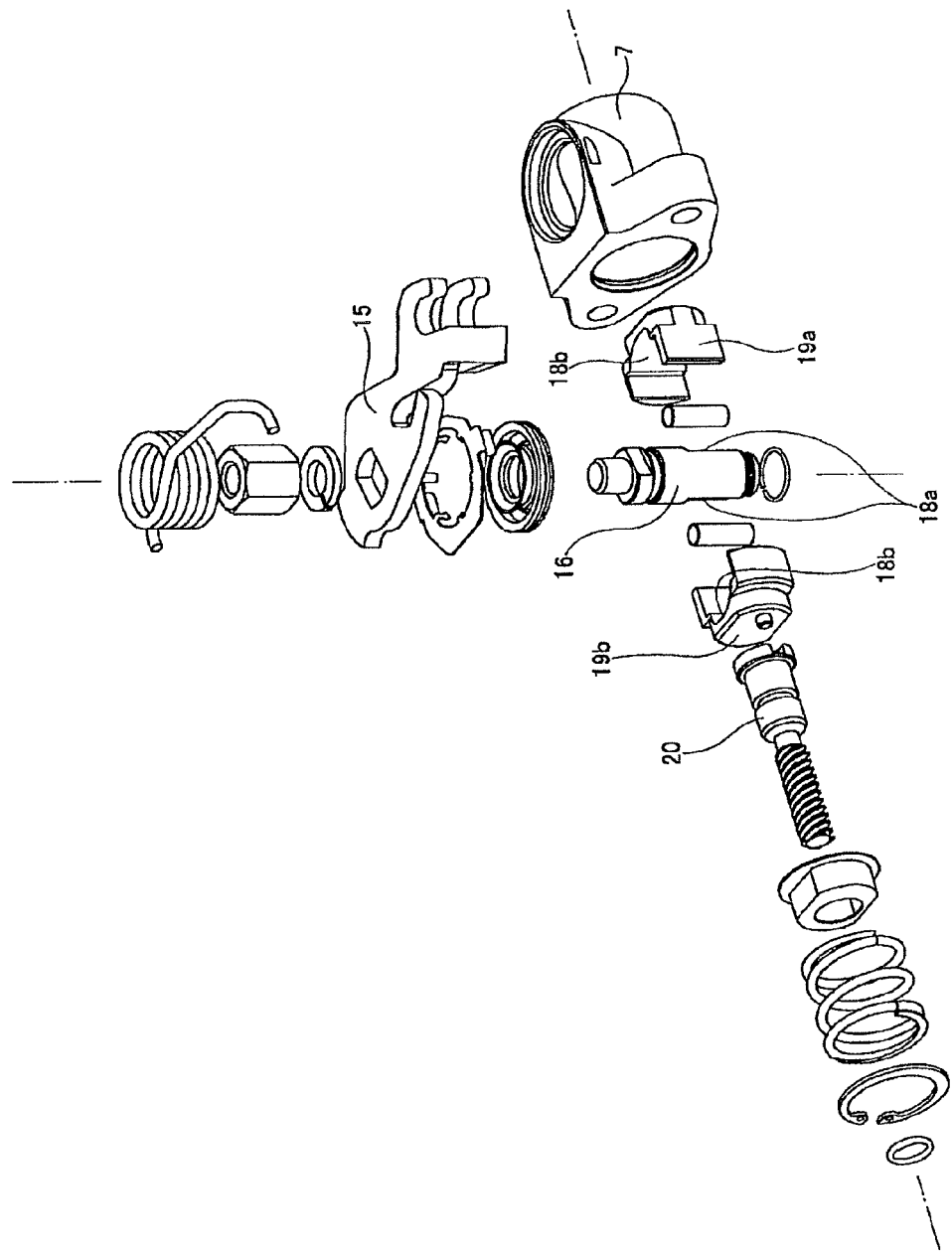
FIG. 31 is an exploded perspective view of a subpart of a caliper and components which are attached to the subpart.

First, the components of the anti-rotor side auxiliary assembly 59d are combined from the state shown in FIG. 23. In particular, the ramp plate 39, the retainer 37 and the balls 38 and 38, the ramp shaft 35, the thrust needle bearing 34, the thrust washer 33, the adjusting nut 24, and the preload spring 44 are incorporated into the anti-rotor side case 45d successively from the bottom plate 79 side. Next, as shown in FIGS. 25(A) and 25(B), the preload spring 44 is elastically compressed by the retaining ring 53a of the rotor side case 46c, and the two wide parts 72a and 72a are displaced to the anti-rotor side beyond the anti-rotor side end edge of the anti-rotor side case 45d.

From this state, the two resilient arms 54a and 54a are elastically pressed in the direction of approaching each other, and the two base plates 81 and 81 are displaced inwards in the radial direction of the anti-rotor side case 45d beyond the inner peripheral surface of the peripheral wall 48a. Next, the force to compress the preload spring 44 is released, as shown in FIGS. 26(A) and 26(B), the two base plates 81 and 81 are made to advance into the inside of the peripheral wall 48a from the anti-rotor side of the peripheral wall 48a, and the two lock claws 55c and 55c are made to contact with the anti-rotor side end edge of the peripheral wall 48a. Since the two resilient arms 54a and 54a do not protrude inwards in the radial direction from the inner peripheral surface of the peripheral wall 48a even in this state, the components 39, 37, 35, 34, and 33 including the ramp plate 39 can be inserted into the anti-rotor side case 45d without producing an excessive wobble in the radial direction. When the two lock claws 55c and 55c contact with the anti-rotor side end edge of the peripheral wall 48a, the ramp plate 39 is pushed on the two continuing parts 80 and 80, and as shown in FIGS. 26(B) and 27(B), is separated from the bottom plate 79.

When the anti-rotor side auxiliary assembly 59d is assembled, as shown in FIGS. 26(A) to 27(B) as mentioned above, the anti-rotor side auxiliary assembly 59d will be pushed into the cylindrical space 9a. From the state that the bottom plate 79 of the anti-rotor side case 45d contacts the back end surface 82 of the cylindrical space 9a, the bottom plate 79 of the anti-rotor side case 45d presses the rotor side case 46c to the back end surface 82. As a result, the two base plates 81 and 81 get out of the inside of the peripheral wall 48a, the two lock claws 55c and 55c are bended outwards in the radial direction from the two base plates 81 and 81, and the two lock claws 55c and 55c are engaged with the lock concave 61a which is formed at the back end of the cylindrical space 9a on the inner peripheral surface. As a result, the anti-rotor side auxiliary assembly 59d including the rotor side case 46c will not being uninstalled from the cylindrical space 9a. When the base plates 81 and 81 get out of the inside of the peripheral wall 48a, the two base plates 81 and 81 and the two continuing parts 80 and 80 are displaced outwards in the radial direction beyond the outer peripheral surface of the ramp plate 39. Thus, the ramp plate 39 gets into the inside of the two base plates 81 and 81 in the radial direction due to the elasticity of the preload spring 44. As a result, by using the structure of this example, the anti-rotor side auxiliary assembly 59d can be prevented from unintentionally being uninstalled from the cylindrical space 9a without pulling out the two lock claws 55c and 55c from the lock concave 61a.

Since the structures and operations of other components are the same as those of the first example of the typical embodiments mentioned above, the same symbols are given to equivalent components and their descriptions are omitted.

According to the above embodiments, a disc brake apparatus with a parking mechanism includes a rotor, a support member, an inner pad, an outer pad, a caliper, a piston and a parking mechanism.

The rotor is rotated with a vehicle wheel.

The support member is adjacent to the rotor, and is supported by and fixed to a vehicle body.

The inner pad and the outer pad hold the rotor from both sides in the axial direction, and are supported by the support member to be displaceable in the axial direction.

The caliper is provided with a caliper claw to push the outer side surface of the outer pad at the outer side end, and a cylindrical space which opens to the inner pad at the inner side half part, respectively, and is supported by the support member to be displaceable in the axial direction.

The piston is embedded in a part of the cylindrical space that is close to the opening, and is displaceable in the axial direction.

The parking mechanism is provided between the back end surface of the cylindrical space and the piston, expands an axial dimension with the rotation of some parts that are rotated with the swing displacement of a parking lever which is provided outside the cylindrical space, and pushes the piston toward the inner pad.

The disc brake apparatus with the parking mechanism may further include an anti-rotor side case and a rotor side case.

The components among the components of the parking mechanism except the components that are installed to the piston may be installed between the anti-rotor side case and the rotor side case. The anti-rotor side case may be embedded and supported in the back end of the cylindrical space, and the rotor side case may be placed at the rotor side of the anti-rotor side case.

A plurality of lock claws which are bended outwards in the radial direction of the rotor side case may be formed at the anti-rotor side end of the rotor side case of the two cases, and lock parts which have end edges that face to the anti-rotor side may be similarly formed at a part of the anti-rotor side case.

Before the anti-rotor side case and the rotor side case are installed at predetermined positions of the cylindrical space, the two cases may be prevented from being separated by means of the engagement of the lock claws and the lock parts.

On the other hand, when the anti-rotor side case of the two cases is embedded at a predetermined position of the back end of the cylindrical space, and the rotor side case is installed at a predetermined position of the cylindrical space, the two cases may be prevented from being uninstalled from the cylindrical space by engaging the lock claws with a lock concave which is formed on the inner peripheral surface of the cylindrical space.

The anti-rotor side case may be embedded and supported at the back end of the cylindrical space so that rotation is prevent. The components that are installed between the anti-rotor side case and the rotor side case may be an anti-rotor side cam member, a rotor side cam member, a plurality of rolling elements, an adjusting nut, a thrust bearing and a compression spring.

The anti-rotor side cam member is circular shaped, a plurality of anti-rotor side ramp parts whose depth in the axial direction gradually changes in the circumferential direction of the two cases are formed at the rotor side surface of the anti-rotor side cam member, and a through hole is formed in the central part of the anti-rotor side cam member, and the anti-rotor side cam member is embedded and supported at the back end of the anti-rotor side case so that the rotation relative to the anti-rotor side case is prevented.

The rotor side cam member may be provided with an outwards flange-like ramp plate part at the rotor side end of a shaft which is inserted into the through hole. At the parts corresponding to the anti-rotor side ramp parts at the anti-rotor side surface of the ramp plate part, a plurality of rotor side ramp parts may be formed whose depth in the axial direction gradually changes reversely to the anti-rotor side ramp parts in the circumferential direction.

The rolling elements may be provided between the anti-rotor side ramp parts and the rotor side ramp parts to be freely rollable. The adjusting nut is cylindrical, a multi-thread adjusting female screw is formed in the center of the adjusting nut, an outwards flange-like collar is formed at the part of the outer peripheral surface of the adjusting nut that is close to the anti-rotor, and the rotation may be prevented by means of the engagement of some parts of the collar with the anti-rotor side case.

The thrust bearing may be held between the rotor surface of the rotor side cam member and the anti-rotor side surface of the collar. The compression spring may be compressed elastically in the axial direction and be held between the rotor side surface of the collar and the rotor side case.

The lock parts may be lock holes which are formed at the rotor side end of the anti-rotor side case.

After the anti-rotor side case is embedded at the predetermined position of the back end of the cylindrical space, the lock claws may be inserted into the lock holes from inside to outside in the radial direction either before or after the rotor side case is installed at the predetermined position of the cylindrical space. The separation of the two cases may be prevented by engaging parts of the lock claws with the rotor side end edges of the lock holes before the installation. In contrast, after the installation, the two cases may be prevented from being uninstalled from the cylindrical space by engaging the protruded parts from the outer peripheral surface of the anti-rotor side case at the front ends of the lock claws with the lock concave.

The lock claws may be formed at a plurality of places in the circumferential direction of the rotor side case at the anti-rotor side end of the rotor side case, and the lock holes may be formed at the rotor side end of the anti-rotor side case.

When the compression spring assembled between the anti-rotor side case and the rotor side case is only compressed by a predetermined amount, the front ends of the lock claws and the rotor side edges of the lock holes are engaged so that the anti-rotor side case and the rotor side case will not be separated.

When the compression spring is compressed beyond the predetermined amount, the front ends of the lock claws may be protruded from the outer peripheral surface of the anti-rotor side case for an amount so that the front ends of the lock claws engage with the lock concave which is formed on the inner peripheral surface of the cylindrical space.

The lock claws may be formed by bending the front ends of the resilient arms outwards in the radial direction of the anti-rotor side case. Steps may be formed at the parts in the middle of the resilient arms that are close to the front ends by bending the front ends outwards so that the front ends are outside the base ends in the radial direction of the anti-rotor side case.

When the parts of the resilient arms which are closer to the front end side than the steps contact the inner peripheral surface of the anti-rotor side case, the front ends of the lock claws and the lock holes may be engaged so that the anti-rotor side case and the rotor side case will not be separated. When the parts of the resilient arms which are closer to the base end side than the steps contact the inner peripheral surface of the anti-rotor side case, and the steps enter into the lock holes, the parts protruded from the outer peripheral surface of the anti-rotor side case at the front ends of the lock claws may be engaged with the lock concave which is formed on the inner peripheral surface of the cylindrical space.

Pressing plates may be formed at the anti-rotor side ends of the lock holes by being bended inwards in the radial direction of the anti-rotor side case and extending towards the rotor side case. When the steps of the resilient arms enter into the lock holes, the lock claws may be prevented from being displaced in the direction of uninstalling from the lock concave by making the front ends of the resilient arms enter the outside of the pressing plates in the radial direction.

The lock claws may be formed by bending the front ends of the resilient arms outwards in the radial direction of the rotor side case. The middle parts of the lock claws may be provided with wide parts which are wider than the front ends. The lock holes may be provided with narrow parts at the rotor side parts which allow the front ends of the lock claws pass but do not allow the wide parts of the lock claws pass, and wide parts at the anti-rotor side parts which allow the wide parts of the lock claws pass, respectively.

When the wide parts are engaged with the two side edges of the narrow parts, the front ends of the lock claws and the lock holes may be engaged so that the anti-rotor side case and the rotor side case will not be separated. Further, when the wide parts of the lock claws pass the wide parts of the lock holes, the parts protruded from the outer peripheral surface of the rotor side case at the front ends of the lock claws may be engaged with the lock concave which is formed on the inner peripheral surface of the cylindrical space.

The lock claws may be formed by bending the anti-rotor side half parts of wide parts, which are provided at the front ends of the resilient arms that extend from a plurality of positions of the outer peripheral edge of the rotor side case in the circumferential direction of the rotor side case to the anti-rotor side and whose width in the circumferential direction of the rotor side case is larger than the width of the resilient arms in the same direction, outwards in the radial direction of the rotor side case. Communication parts whose width in the circumferential direction of the anti-rotor side case is larger than the width of the resilient arms may be provided between the central part of the lock holes in the circumferential direction of the anti-rotor side case and the rotor side end edge of the anti-rotor side case.

After the anti-rotor side case is embedded at the predetermined position of the back end of the cylindrical space, and before the rotor side case is installed at the predetermined position of the cylindrical space, the lock claws are inserted through the lock holes from inside to outside in the radial direction of the anti-rotor side case, and the two cases may be prevented from being separated by means of the engagement of the lock claws with the two end parts in the circumferential direction of the lock holes.

In contrast, after the installation, when the resilient arms pass the communication parts and are displaced outwards in the radial direction of the anti-rotor side case beyond the anti-rotor side case, the two cases are prevented from being uninstalled from the cylindrical space by means of the engagement of the front ends of the lock claws with the lock concave, and the lock claws may be prevented from being uninstalled from the lock concave by means of the movement of the wide parts towards the outside of the communication parts in the radial direction of the anti-rotor side case.

The lock parts may be the anti-rotor side end edge of the peripheral wall which forms the anti-rotor side case.

The peripheral wall may have an incomplete cylindrical shape which has slits at a plurality of positions in the circumferential direction that communicate in the axial direction from the rotor side end edge to the anti-rotor side end edge. Parts of the peripheral wall may be divided in the circumferential direction by the slits and mutually connected by a bottom plate which is provided at the anti-rotor side end of the anti-rotor side case. The bottom plate may be not provided at parts of the anti-rotor end edge of the peripheral wall that align with the slits in the circumferential direction or parts of the anti-rotor end edge of the peripheral wall beside the slits.

The lock claws may be provided at the front ends of a plurality of resilient arms. In this case, the resilient arms may extend to the anti-rotor side from a plurality of positions of the outer peripheral edge of the rotor side case in the circumferential direction of the rotor side case that align with the slits. The width of the resilient arms in the circumferential direction may be smaller than the width of the slit in the same direction (circumferential direction of the rotor case). The lock claws may be formed by bending the anti-rotor side half parts of wide parts which are provided at the front ends of the resilient arms and whose width in the same direction is larger than the width of the slits in the same direction outwards in the radial direction of the rotor side case. After the anti-rotor side case is embedded at the predetermined position of the back end of the cylindrical space, and before the rotor side case is installed at the predetermined position of the cylindrical space, the two cases may be prevented from being separated by means of the engagement of the lock claws with the parts of anti-rotor side back end edge of the peripheral wall beside the slits in the circumferential direction. In contrast, after the installation, the resilient arms are displaced outwards in the radial direction of the anti-rotor side case in the slits so that the two cases may be prevented from being uninstalled from the cylindrical space by engaging the front ends of the lock claws with the lock concave.

Continuing parts may be provided between the wide parts and the resilient arms by bending inwards in the radial direction of the rotor side case from the front end edges of the resilient arms. When base plates which are the rotor side half parts of the wide parts contact the parts of the inner peripheral surface of the anti-rotor side end of the peripheral wall beside the slits, the resilient arms may not be protruded inwards in the radial direction from the inner peripheral surface of the peripheral wall.

When the two cases are prevented from being uninstalled from the cylindrical space by engaging the front ends of the lock claws with the lock concave, some of the components that form the parking mechanism are made to enter the inside of the base plates of the wide parts in the radial direction of the rotor side case so that the lock claws may be prevented from being displaced inwards in the radial direction of the rotor side case.

According to the disc brake apparatus with the parking mechanism of the above embodiments, the operativity of assembling the components, among the components of the adjusting mechanism and the parking mechanism, that are incorporated into the inner part of the cylindrical space provided in the caliper can be improved. That is, the above components that are installed in the cylindrical space in a complete state are assembled between the anti-rotor side case and the rotor side case in a wide space outside the cylindrical space, and can be packed as a sub-assembly unit. Besides, when the sub-assembly unit is assembled, by including the anti-rotor side case and the rotor side case, the time that was required to plastically deform the components becomes unnecessary. Therefore, compared with the conventional structure described in the above-mentioned patent document 3, the assembling operation becomes easier (the assembling operativity is improved).

When the sub-assembly unit which is assembled outside the cylindrical space is inserted into the back part of the cylindrical space, the protrusion amount of the lock claws from the outer peripheral surface of the other case (anti-rotor side case) where the lock holes are formed is kept to be small. Therefore, when the sub-assembly unit is inserted, the possibility that the front end edges of the lock claws rub against the inner peripheral surface of the cylindrical space is lowered and the possibility that the inner peripheral surface is damaged can be lowered.

After the sub-assembly unit is inserted into the inner part of the cylindrical space, the front ends of the lock claws can be definitely prevented from being uninstalled from the lock concave. Therefore, after the sub-assembly unit is inserted into the inner part of the cylindrical space, and before other components such as the piston are assembled to the part of the cylindrical space that is close to the opening, the sub-assembly unit can be prevented from unintentionally being uninstalled from the cylindrical space.

This application is based on the Japanese patent application (patent application 2010-014206) filed on Jan. 26, 2010, and the Japanese patent application (patent application 2010-191907) filed on Aug. 30, 2010, whose contents are incorporated herein by reference.

INDUSTRIAL APPLICABILITY

According to the disc brake apparatus with the parking mechanism of the invention, the disc brake apparatus can be provided which has a structure so that the operativity of assembling the components, among the components of an adjusting mechanism and a parking mechanism, that are incorporated into the inner part of a cylindrical space provided in a caliper is improved, and the inner peripheral surface of the cylindrical space is not likely to be damaged in the assembling operation.

REFERENCE SIGNS LIST 1 and 1a Rotor
2 and 2a Support member
3 and 3a Inner pad
4 and 4a Outer pad
5 and 5a Caliper
6 main part
7 subpart
8 bolt
9 and 9a cylindrical space
10 and 10a Piston
11 sleeve
12 and 12a adjusting mechanism
13 and 13a cam mechanism
14 and 14a caliper claw
15 and 15a Parking lever
16 cam shaft
17 roller
18a to 18d cam surface
19a and 19b cam member
20 and 20a adjusting spindle
21 adjusting screw
22 spring
23 cylindrical part
24 adjusting nut
25 adjusting spring
26 thrust bearing
27 adjusting collar
28 multi-thread male screw
29 receiving surface
30 snap ring
31 multi-thread female screw
32 thrust receiving collar
33 thrust washer
34 thrust needle bearing
35 ramp shaft
36 ramp plate part
37 retainer
38 ball
39 and 39a ramp plate
40a and 40b ramp slot
41 driving shaft
42 central hole
43 through hole
44 preload spring
45, 45a, 45b, 45c and 45d anti-rotor side case
46, 46a, 46b and 46c rotor side case
47 cam case
48 and 48a peripheral wall
49a and 49b bended board
50 cylindrical member
51, 51a and 51b lock hole
52 guide notch
53 and 53a retaining ring
54 and 54a resilient arm
55, 55a, 55b and 55c lock claw
56 step
57a and 57b concave
58 guide protrusion
59, 59a, 59b, 59c and 59d anti-rotor side auxiliary assembly
60 receiving hole
61 and 61a lock concave
62 O ring
63 sleeve
64 rotor side auxiliary assembly
65 lock groove
66 oil ring
67 boots
68 pressing plate
69 protrusion
70 narrow part
71 and 71a wide part
72 and 72a wide part
73 communication part
74 protrusion plate
75 lock pin
76 side edge
77 stepped surface
78 slit
79 bottom plate
80 continuing part
81 base plate
82 back end surface

The invention claimed is:

1. A disc brake apparatus with a parking mechanism, comprising:
a rotor which is rotated with a vehicle wheel;
a support member which is adjacent to the rotor and is supported by and fixed to a vehicle body;
an inner pad and an outer pad which hold the rotor from both sides in the axial direction, and are supported by the support member to be displaceable in the axial direction;
a caliper which is provided with a caliper claw at an outer side end to push an outer side surface of the outer pad, and a cylindrical space at an inner side half part which opens to the inner pad, respectively, and is supported by the support member to be displaceable in the axial direction;
a piston which is embedded in a part of the cylindrical space that is close to the opening, and is displaceable in the axial direction; and
a parking mechanism which is provided between a back end surface of the cylindrical space and the piston,
wherein the parking mechanism expands an axial dimension with a rotation of a component that is rotated with a swing displacement of a parking lever which is provided outside the cylindrical space, and pushes the piston toward the inner pad, components among the components of the parking mechanism except components that are installed to the piston are installed between an anti-rotor side case which is embedded and supported in the back end of the cylindrical space and a rotor side case which is placed at a rotor side of the anti-rotor side case, a plurality of resilient arms that extend from a plurality of positions of an outer peripheral edge of the rotor side case in a circumferential direction of the rotor side case to the anti-rotor side, a plurality of lock claws, each of which is a front end portion of each of the resilient arms bended outwards in a radial direction of the rotor side case, are formed at an anti-rotor side end of the rotor side case of the two cases, lock parts which have end edges that face to the anti-rotor side are formed at a part of the anti-rotor side case, in a state before the anti-rotor side case and the rotor side case are installed at predetermined positions of the cylindrical space, a diameter of a circumscribed circle of the lock claws is smaller than an inside diameter of the cylindrical space, and the two cases are prevented from being separated by means of an engagement of the lock claws and the lock parts, in a state where the anti-rotor side case of the two cases is embedded at a predetermined position of the back end of the cylindrical space and the rotor side case is installed at a predetermined position of the cylindrical space, a protrusion amount of the lock claws from an outer peripheral surface of the anti-rotor side case is increased by the resilient arms, and the two cases are prevented from being uninstalled from the cylindrical space by engaging the lock claws with a lock concave which is formed on an inner peripheral surface of the cylindrical space, a compression spring is assembled between the anti-rotor side case and the rotor side case, in a state where the compression spring is compressed by a predetermined amount, the lock claws and the lock parts are engaged so that the anti-rotor side case and the rotor side case are not separated, and in a state where the compression spring is compressed beyond the predetermined amount, the lock claws engage with the lock concave.

2. The disc brake apparatus with the parking mechanism according to claim 1, wherein the anti-rotor side case is embedded and supported at the back end of the cylindrical space so that rotation is prevent, and the components that are installed between the anti-rotor side case and the rotor side case include:

an circular shaped anti-rotor side cam member which is provided with a plurality of anti-rotor side ramp parts whose depth in the axial direction gradually changes in the circumferential direction at the rotor side surface, and a through hole in the central part, and is embedded and supported at the back end of the anti-rotor side case so that a rotation relative to the anti-rotor side case is prevented;

a rotor side cam member which is provided with an outwards flange-like ramp plate part at the rotor side end of a shaft which is inserted into the through hole, and a plurality of rotor side ramp parts at the parts corresponding to the anti-rotor side ramp parts at the anti-rotor side surface of the ramp plate part whose depth in the axial direction gradually changes reversely to the anti-rotor side ramp parts in the circumferential direction;

rolling elements which are provided between the anti-rotor side ramp parts and the rotor side ramp parts to be freely rollable;

a cylindrical adjusting nut which is provided with a multi-thread adjusting female screw in the center part, and an outwards collar at the part of the outer peripheral surface that is close to the anti-rotor so that the rotation is prevented by means of the engagement of some parts of the collar with the anti-rotor side case;

a thrust bearing which are held between the rotor surface of the rotor side cam member and the anti-rotor side surface of the collar; and the compression spring which is compressed elastically in the axial direction and held between the rotor side surface of the collar and the rotor side case.

3. The disc brake apparatus with the parking mechanism according to claim 1, wherein the lock parts are lock holes which are formed at the rotor side end of the anti-rotor side case.

4. The disc brake apparatus with the parking mechanism according to claim 3, wherein after the anti-rotor side case is embedded at the predetermined position of the back end of the cylindrical space, the lock claws are inserted into the lock holes from inside to outside in the radial direction either before or after the rotor side case is installed at the predetermined position of the cylindrical space, before the installation, the separation of the two cases is prevented by engaging parts of the lock claws with the rotor side end edges of the lock holes, and after the installation, the two cases are prevented from being uninstalled from the cylindrical space by engaging protruded parts from the outer peripheral surface of the anti-rotor side case at the front ends of the lock claws with the lock concave.

5. The disc brake apparatus with the parking mechanism according to claim 3, wherein the lock claws are formed at a plurality of places in the circumferential direction of the rotor side case at the anti-rotor side end of the rotor side case, the lock holes are formed at the rotor side end of the anti-rotor side case, in a state where the compression spring assembled between the anti-rotor side case and the rotor side case is compressed by a predetermined amount, the front ends of the lock claws and the rotor side edges of the lock holes are engaged so that the anti-rotor side case and the rotor side case are not separated, and in a state where the compression spring is compressed over the predetermined amount, the front ends of the lock claws are protruded from the outer peripheral surface of the anti-rotor side case for an amount so that the front ends of the lock claws engage with the lock concave which is formed on the inner peripheral surface of the cylindrical space.

6. The disc brake apparatus with the parking mechanism according to claim 5, wherein steps are formed at the parts in the middle of the resilient arms that are close to the front ends by bending the front ends outwards so that the front ends are outside the base ends in the radial direction of the anti-rotor side case, in a state where the parts of the resilient arms which are closer to the front end side than the steps contact the inner peripheral surface of the anti-rotor side case, the front ends of the lock claws and the lock holes are engaged so that the anti-rotor side case and the rotor side case are not separated, and in a state where the parts of the resilient arms which are closer to the base end side than the steps contact the inner peripheral surface of the anti-rotor side case, the parts protruded from the outer peripheral surface of the anti-rotor side case at the front ends of the lock claws are engaged with the lock concave which is formed on the inner peripheral surface of the cylindrical space.

7. The disc brake apparatus with the parking mechanism according to claim 6, wherein pressing plates are formed at the anti-rotor side ends of the lock holes by being bended inwards in the radial direction of the anti-rotor side case and extending towards the rotor side case, and when the steps of the resilient arms enter into the lock holes, the lock claws are prevented from being displaced in the direction of uninstalling from the lock concave by making the front ends of the resilient arms enter the outside of the pressing plates in the radial direction.

8. The disc brake apparatus with the parking mechanism according to claim 5, wherein the middle parts of the lock claws are provided with wide parts which are wider than the front ends, the lock holes are provided with narrow parts at the rotor side parts which allow the front ends of the lock claws pass but do not allow the wide parts of the lock claws pass, and wide parts at the anti-rotor side parts which allow the wide parts of the lock claws pass, respectively, in a state where the wide parts are engaged with the two side edges of the narrow parts, the front ends of the lock claws and the lock holes are engaged so that the anti-rotor side case and the rotor side case will not be separated, and in a state where the wide parts of the lock claws pass the wide parts of the lock holes, the parts protruded from the outer peripheral surface of the rotor side case at the front ends of the lock claws are engaged with the lock concave which is formed on the inner peripheral surface of the cylindrical space.

9. The disc brake apparatus with the parking mechanism according to claim 3, wherein the lock claws are formed by bending the anti-rotor side half parts of wide parts, which are provided at the front ends of the resilient arms and whose width in the circumferential direction of the rotor side case is larger than the width of the resilient arms in the same direction, outwards in the radial direction of the rotor side case, communication parts whose width in the circumferential direction of the anti-rotor side case is larger than the width of the resilient arms are provided between the central part of the lock holes in the circumferential direction of the anti-rotor side case and the rotor side end edge of the anti-rotor side case, in a state after the anti-rotor side case is embedded at the predetermined position of the back end of the cylindrical space and before the rotor side case is installed at the predetermined position of the cylindrical space, the lock claws are inserted through the lock holes from inside to outside in the radial direction of the anti-rotor side case, and the two cases are prevented from being separated by means of the engagement of the lock claws with the two end parts in the circumferential direction of the lock holes, and after the installation, in a state where the resilient arms pass the communication parts and are displaced outwards in the radial direction of the anti-rotor side case beyond the anti-rotor side case, the two cases are prevented from being uninstalled from the cylindrical space by means of the engagement of the front ends of the lock claws with the lock concave, and the lock claws are prevented from being uninstalled from the lock concave by means of the movement of the wide parts towards the outside of the communication parts in the radial direction of the anti-rotor side case.

10. The disc brake apparatus with the parking mechanism according to claim 1, wherein the lock parts are the anti-rotor side end edge of the peripheral wall which forms the anti-rotor side case.

11. The disc brake apparatus with the parking mechanism according to claim 10, wherein the peripheral wall has an incomplete cylindrical shape which has slits at a plurality of positions in the circumferential direction that communicate in the axial direction from the rotor side end edge to the anti-rotor side end edge, parts of the peripheral wall are divided in the circumferential direction by the slits and mutually connected by a bottom plate which is provided at the anti-rotor side end of the anti-rotor side case, and the bottom plate are not provided at parts of the anti-rotor end edge of the peripheral wall that align with the slits in the circumferential direction or parts of the anti-rotor end edge of the peripheral wall beside the slits.

12. The disc brake apparatus with the parking mechanism according to claim 11, wherein the lock claws extend to the anti-rotor side from a plurality of positions of the outer peripheral edge of the rotor side case in the circumferential direction of the rotor side case that align with the slits, and are formed by bending the anti-rotor side half parts of wide parts, which are provided at the front ends of the resilient arms whose width in the circumferential direction is smaller than the width of the slits in the same direction, and whose width in the same direction is larger than the width of the slits in the same direction, outwards in the radial direction of the rotor side case, in a state where after the anti-rotor side case is embedded at the predetermined position of the back end of the cylindrical space and before the rotor side case is installed at the predetermined position of the cylindrical space, the two cases are prevented from being separated by means of the engagement of the lock claws with the parts of anti-rotor side back end edge of the peripheral wall beside the slits in the circumferential direction, and after the installation, the resilient arms are displaced outwards in the radial direction of the anti-rotor side case in the slits so that the two cases are prevented from being uninstalled from the cylindrical space by engaging the front ends of the lock claws with the lock concave.

13. The disc brake apparatus with the parking mechanism according to claim 12, wherein continuing parts are provided between the wide parts and the resilient arms by bending inwards in the radial direction of the rotor side case from the front end edges of the resilient arms, and in a state where base plates which are the rotor side half parts of the wide parts contact the parts of the inner peripheral surface of the anti-rotor side end of the peripheral wall beside the slits, the resilient arms are not protruded inwards in the radial direction from the inner peripheral surface of the peripheral wall.

14. The disc brake apparatus with the parking mechanism according to claim 13, wherein in a state where the two cases are prevented from uninstall from the cylindrical space by engaging the front ends of the lock claws with the lock concave, some of the components that form the parking mechanism are made to enter the inside of the base plates of the wide parts in the radial direction of the rotor side case so that the lock claws are prevented from being displaced inwards in the radial direction of the rotor side case.

* * * * *